(12) United States Patent
Helfenstein et al.

(10) Patent No.: US 12,449,289 B2
(45) Date of Patent: Oct. 21, 2025

(54) FLOWMETER

(71) Applicant: GWF AG, Lucerne (CH)

(72) Inventors: Markus Helfenstein, Lucerne (CH); Florian Strasser, Lucerne (CH)

(73) Assignee: GWF AG, Lucerne (CH)

( * ) Notice: Subject to any disclaimer, the term of this patent is extended or adjusted under 35 U.S.C. 154(b) by 297 days.

(21) Appl. No.: 18/030,751

(22) PCT Filed: Oct. 14, 2021

(86) PCT No.: PCT/EP2021/078547
§ 371 (c)(1),
(2) Date: Apr. 6, 2023

(87) PCT Pub. No.: WO2022/079213
PCT Pub. Date: Apr. 21, 2022

(65) Prior Publication Data
US 2023/0375386 A1    Nov. 23, 2023

(30) Foreign Application Priority Data

| Oct. 14, 2020 | (DE) | 10 2020 127 027.5 |
| Nov. 17, 2020 | (DE) | 10 2020 130 357.2 |
| Nov. 18, 2020 | (DE) | 10 2020 130 517.6 |

(51) Int. Cl.
| G01F 1/66 | (2022.01) |
| G01F 1/667 | (2022.01) |
| G01F 15/06 | (2022.01) |
| G01F 15/14 | (2006.01) |

(52) U.S. Cl.
CPC ............. *G01F 1/662* (2013.01); *G01F 1/667* (2013.01); *G01F 15/06* (2013.01); *G01F 15/14* (2013.01)

(58) Field of Classification Search
CPC .......... G01F 1/662; G01F 1/667; G01F 15/06; G01F 15/14
USPC ....................................................... 73/861.27
See application file for complete search history.

(56) References Cited

U.S. PATENT DOCUMENTS

| 7,469,599 B2 | 12/2008 | Froehlich et al. |
| 7,607,359 B2 | 10/2009 | Hecht et al. |
| 8,424,392 B2 | 4/2013 | Kroemer et al. |
| 8,516,901 B2 | 8/2013 | Kroemer et al. |
| 10,746,580 B2 * | 8/2020 | Kuhlemann ............ G01F 15/18 |
| 11,204,269 B2 | 12/2021 | Fuchs et al. |
| 11,243,104 B2 | 2/2022 | Helfenstein |
| 11,371,869 B2 * | 6/2022 | Scarborough, III .... G01F 1/667 |
| 2013/0167655 A1 | 7/2013 | Fujii et al. |
| 2014/0230541 A1 | 8/2014 | Herold et al. |
| 2019/0226892 A1 | 7/2019 | Kuhlemann et al. |

(Continued)

FOREIGN PATENT DOCUMENTS

| CN | 109477742 | 3/2019 |
| CN | 110940385 | 3/2020 |

(Continued)

OTHER PUBLICATIONS

International Search Report dated Jan. 25, 2022 from International Application No. PCT/EP2021/078547.

(Continued)

*Primary Examiner* — Nathaniel T Woodward
(74) *Attorney, Agent, or Firm* — Beyer Law Group LLP

(57) ABSTRACT

Disclosed is a flowmeter with an optimized flow cross-section.

20 Claims, 23 Drawing Sheets

(56) References Cited

U.S. PATENT DOCUMENTS

Figure 1:
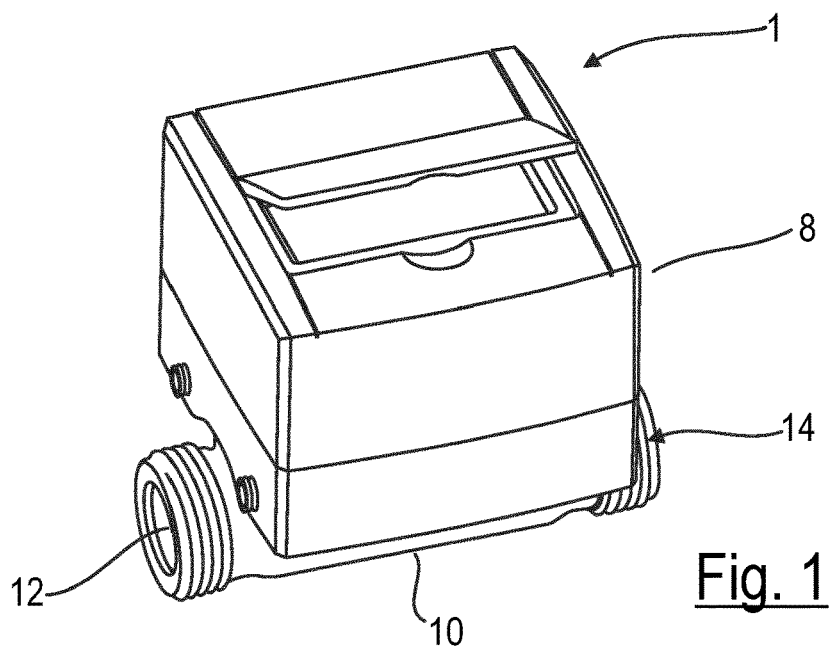

| | | | |
|---|---|---|---|
| 2019/0368907 A1 | 12/2019 | Fuchs et al. | |
| 2021/0131845 A1* | 5/2021 | Scarborough, III | .... G01F 1/662 |
| 2022/0136880 A1 | 5/2022 | Pilegaard et al. | |

FOREIGN PATENT DOCUMENTS

| CN | 111033184 | 4/2020 |
|---|---|---|
| DE | 199 44 411 | 4/2001 |
| DE | 101 20 355 | 10/2002 |
| DE | 10 2004 061 404 | 7/2006 |
| DE | 10 2005 057 888 | 6/2007 |
| EP | 0 650 034 | 4/1995 |
| EP | 0 890 826 | 1/1999 |
| EP | 1 544 582 | 6/2005 |
| EP | 2 236 998 | 10/2010 |
| EP | 2 306 160 | 4/2011 |
| EP | 2 423 648 | 2/2012 |
| EP | 2 414 789 | 5/2013 |
| EP | 2 696 174 | 2/2014 |
| EP | 2 770 304 | 8/2014 |
| EP | 2 840 362 | 2/2015 |
| EP | 2 386 836 | 1/2016 |
| EP | 2 988 103 | 2/2016 |
| EP | 3 591 347 | 1/2020 |
| EP | 3 611 480 | 2/2020 |
| EP | 3 748 311 | 12/2020 |
| EP | 3 550 272 | 3/2021 |
| EP | 2 888 561 | 6/2021 |
| WO | WO 2004/036151 | 4/2004 |
| WO | WO 2011/127934 | 10/2011 |
| WO | WO 2013/041104 | 3/2013 |
| WO | WO 2014/029404 | 2/2014 |
| WO | WO 2016/012024 | 1/2016 |
| WO | WO 2018/011371 | 1/2018 |
| WO | WO 2018/011372 | 1/2018 |
| WO | WO 2020/007927 | 1/2020 |
| WO | WO 2022/079214 | 4/2022 |

OTHER PUBLICATIONS

Written Opinion dated Jan. 25, 2022 from International Application No. PCT/EP2021/078547.

Indian Office Action dated Jan. 13, 2025 from Indian Application No. 202317027552.

Chinese Office Action with English machine translation dated Apr. 26, 2025 from Chinese Application No. 202180070394.6.

* cited by examiner

90°-Drehung der Batterie erforderlich

FLOWMETER

The invention relates to a flowmeter for measuring the flow of fluids in a pipeline or the like according to the generic term of patent claim 1.

Flowmeters can, for example, have two ultrasonic transducers that are inserted as a so-called "clip-on solution" at a distance from each other on a pipe section of the pipeline, with both transducers acting as transmitter and receiver. The measurement signals are coupled into the fluid at an angle through the wall of the pipe section.

The flow rate can then be determined from the transit time of the measurement signals from the transmitter to the receiver in a manner known per se. Such flowmeters are described, for example, in WO 2004/036151 A1 and DE 10 2005 057 888.

A disadvantage of clip-on flowmeters is that the measurement signals pass through the wall of the measuring channel, so that different measurement signals are obtained for different materials from which the measuring channel may be made. Thus, the material influence must be considered in the measurement signal evaluation.

Furthermore, solutions with a measuring insert accommodating the ultrasonic transducers are known. This measuring insert is inserted into a recess of a pipe section/ measuring channel, whereby the actual measuring channel can also be a part of this measuring insert.

Such a solution is disclosed, for example, in DE 101 20 355 A1, where the two ultrasonic transducers are arranged at a distance from each other in the flow direction and on opposite sides of the measuring channel.

EP 2 306 160 A1 discloses a flowmeter/flow counter in which the measuring insert both accommodates the ultrasonic transducers and forms the actual measuring channel. This measuring insert is attached to a tangentially extending flange of a pipe section of a flowmeter housing. In this case, a profile body that forms the measuring channel, which influences the flow within the measuring area and on which additional reflectors are provided for the measurement signals, is inserted through a recess in the pipe section encompassed by the flange. In this solution, the two ultrasonic transducers are arranged in a pot-shaped housing part of the measuring insert, which is closed towards the flow and immersed in it.

A similar solution is shown in EP 2 386 836 B1. In this design example, the measuring insert carries two ultrasonic transducers arranged offset from each other in the direction of flow, which are also accommodated in a pot-shaped housing part and project into the measuring channel through an opening of a pipe section of a housing surrounded by a flange. The flow routing within the measuring channel is determined by a housing insert which can be inserted from the front side of the housing and which also carries reflectors for the ultrasonic signals, so that the ultrasound is emitted from one of the ultrasonic transducers and reflected via the reflectors to the other ultrasonic transducer located, for example, downstream. Of course, the signal can also be routed in the opposite direction.

In the EP 0 890 826 B1, a flowmeter is described in which a measuring insert is also attached to a tangentially extending flange in the area of a pipe section of a housing. The measuring insert carries two ultrasonic transducers, which are inserted into recesses in a base of a housing part and sealed there using a seal each. The entire measuring insert is then sealed against the flange with another circumferential seal that embraces both ultrasonic transducers. Also in this design example, the measuring channel is formed by a measuring insert which is inserted into the pipe section of the housing through the recess encompassed by the flange. A similar solution is described in U.S. Pat. No. 8,424,392 B2 and EP 3 748 311 A1.

DE 199 44 411 A1 discloses a flowmeter in which an insert is formed in a measuring tube, which defines the elongated cross-section of the measuring tube. Two ultrasonic transducers are arranged offset in the direction of flow on the opposite sides of the measuring channel.

EP 0 650 034 A1 describes a flowmeter in which two ultrasonic transducers are also arranged offset from each other. Opposite to each other, a reflector is provided, which is arranged on inclined surfaces of the measuring channel.

In all the solutions described above, the reflectors are formed diametrically to the ultrasonic transducers, so that at least two reflectors must be provided to guide the ultrasonic signals.

In the flowmeter according to EP 0 890 826 B1, the two ultrasonic transducers are each arranged in a sensor housing, subsequently referred to as a coupling piece, and project radially into the measuring channel so that the fluid flows around them.

US 2013/167 655 A1 and DE 10 2004 061 404 A1 each disclose flowmeters in which two ultrasonic sensors are arranged at an angle in a measuring housing that is mounted on a measuring channel and is open towards the measuring channel, so that turbulence can occur in the transition area to the measuring housing.

The disadvantage of such solutions is that either the ultrasonic transducers with their coupling piece are arranged directly in the flow, or else housing parts surrounding the ultrasonic transducers, for example pot-shaped housing parts, protrude into the flow. Detachments and/or vortices can occur at the ultrasonic transducers or housing parts protruding or receding into the flow, which can lead to measurement errors depending on the flow velocity, among other things.

Flowmeters in which a measuring insert is pushed into a measuring channel in the axial direction have the disadvantage that these measuring inserts are very limited in geometry, since axial insertion requires that the measuring insert and the measuring channel are designed without undercuts. In addition, tapering in the inlet and outlet area is difficult to implement or, at best, requires considerable wall thickness of the measuring insert.

EP 2 696 174 A1 discloses a flowmeter with two ultrasonic sensors attached to a measuring channel, whereby the measurement signals are coupled into and out of the fluid respectively via a coupling piece which is inserted flush into the peripheral wall of the measuring channel.

WO 2018/011 371 A1, which goes back to the applicant, describes a flowmeter in which the measurement signals of two spaced-apart measuring sensors are coupled in and out via a common coupling piece, or one coupling piece each, which carries the sensor(s)/transducer(s).

The parallel patent application WO 2018/011 372 A1 describes a flowmeter with an oval or trapezoidal measuring channel.

Both flowmeter concepts ensure improved flow through the flowmeter compared to the aforementioned state of the art with improved measuring accuracy.

In the publication WO 2016/012024 A1, a flowmeter with a flow-optimized measuring channel is described, which, however, has a very complex design.

WO 2011/127934 A1 discloses a flowmeter in which the ultrasonic sensors are housed in a housing, which in turn is connected to a measuring channel via a locking mechanism.

Such a flowmeter has a very complex design, since the reflectors for redirecting the measuring beam are also implemented on the housing and thus extend into the clear cross-section of the measuring channel in the radial direction and thus have an unfavorable effect on the flow.

EP 2 888 560 A1 describes a flowmeter in which the two ultrasonic sensors are likewise arranged in a closed housing that extends through a radial recess into a measuring channel. These areas in turn interfere with the flow through the measuring channel. Furthermore, these areas of the housing that extend into the interior of the measuring channel serve to define a measuring insert inserted into the measuring channel in the axial direction. This measuring insert carries reflectors to deflect the measuring beams. Similar to the solutions described above, the measuring channel and the measuring insert must be matched to each other in such a way that axial, frontal insertion of the measuring insert is possible.

European patent application EP 3 818 343 A1 addresses the design of a housing with the control unit housed therein. It has a main PCB with a CPU and communications circuitry housed in a module housing, which in turn is housed in the enclosure, which further provides a measuring PCB. The two PCBs are connected to each other via a power and communication link, and the housing also houses a power supply for the components.

Such a housing design is extremely complex and therefore requires considerable technical effort.

European patent EP 2 414 789 B1 concerns a flowmeter in which the ultrasonic sensors are arranged directly on a PCB. Such a concept requires that the PCB and thus the sensors are positioned very close to the flow channel to ensure sufficient signal quality, leaving little freedom in terms of design. The same applies to the concept according to EP 3 550 272 B1, in which the ultrasonic sensors are arranged on the underside of a PCB.

EP 2 888 561 B1 describes an ultrasonic flowmeter in which the ultrasonic sensors are electrically contacted via elastic connectors that are mechanically connected to an insulating carrier arrangement. Such a concept also requires considerable technical effort. In all other respects, the disclosure of EP 2 888 561 B1 corresponds to that of the European patent application EP 2 888 560 B1 described above.

European patent EP 1 544 582 B1 concerns a flowmeter in which a measuring insert is also inserted into a measuring channel in the axial direction. It is further assumed that the cross-section of the measuring channel is hexagonal, octagonal or in the form of a square with rounded corners. Such a measuring insert can also only be realized with considerable technical effort and a corresponding design of the measuring channel cross-section.

In contrast, the invention is based on the task of further designing the flowmeter with regard to a further reduction of the technical effort with optimum measuring accuracy.

This task is solved by a flowmeter with the features of patent claim 1.

Advantageous further developments of the invention are the subject of the subclaims.

According to a first aspect of the invention, the flowmeter has a flow channel attachable to a pipeline through which a fluid flows and on which a measuring unit is held, which has at least two spaced-apart sensors, preferably ultrasonic transducers, whose measurement signals are coupled in and out through at least one recess of the flow channel. The flowmeter further has a control unit housed in a control box for controlling the sensors and processing the measurement signals. The measuring channel is designed as a multi-part measuring channel insert with at least one measuring channel upper part and one measuring channel lower part. A fluid inlet and/or a fluid outlet are each designed as inserts and inserted through the recess into the flow channel.

Compared to the state of the art of technology mentioned at the beginning, such a solution has the advantage that the entire measuring channel insert can be inserted in radial direction through the at least one recess of the flow channel. The overall length of the measuring channel insert with the two inlet/outlet inserts and the measuring channel upper part and the measuring channel lower part is longer than the clear width of the recess.

Such a concept makes it possible, for example, to adapt the measuring channel insert to different nominal sizes of the flowmeter by simply replacing the inserts forming the outlet and the inlet and, if necessary, the lower part of the measuring channel.

The considerable technical effort is particularly simple if both inserts are of identical design.

In a particularly preferred design example of the invention, the inlet and outlet inserts are implemented towards the measuring channel upper part and the measuring channel lower part, respectively, with an axial stop used to define the axial position of the inserts within the flow channel.

The inserts are preferably designed to have a round opening cross-section on the one hand and a rectangular opening cross-section on the other.

The assembly is conducted in such a way that the two inlet and outlet inserts are first inserted through the recess of the flow channel and then moved in the axial direction out of the insertion area until the axial stop runs up against a corresponding shoulder of the flow channel and thus cannot be moved any further. In a subsequent assembly step, the lower part of the measuring channel and the upper part of the measuring channel are then inserted in the radial direction through the aforementioned recess, thereby also fixing the position of the inserts. The two inserts and the lower part of the measuring channel and the upper part of the measuring channel then complement each other to form the measuring channel insert, whose axial length is greater than the clear width of the recess. Such a concept makes it possible to realize any measuring channel geometry while reducing the recesses on the flow channel to a minimum.

According to another aspect of the invention, the flow cross-section of the two inserts and the measuring channel lower part and the measuring channel upper part is such that the flow cross-section will be reduced in the transition region from the inserts to the measuring channel section formed by the measuring channel upper part and the measuring channel lower part, so that the fluid is accelerated in this region. Surprisingly, it was found that this acceleration of the fluid flow and the subsequent increase in cross-section in the measuring channel section can reduce measurement errors.

The flow can be further equalized if guide ribs are provided in the measuring channel in the area of the inlet and outlet inserts.

In a particularly preferred design example, the measuring channel upper part has a housing flange to which the control housing accommodating the control electronics and power supply is attached. In this case, the housing flange also forms a base of the control housing, so that the latter can be manufactured with little effort.

In an alternative solution, the measuring channel upper part and the measuring channel lower part are attached to a base of the control housing so that the base of the control housing, the measuring channel upper part and the measuring channel lower part peripherally delimit the measuring channel section.

Relative positioning of the components is particularly easy if the upper part of the measuring channel, the lower part of the measuring channel and the control housing are positively positioned relative to each other, in particular using fitting pieces/fit recesses.

The flow behavior can be further optimized if the measuring channel section has an approximately rectangular cross-section, preferably with the measuring channel height being greater, e.g., in the direction of the control housing, than transversely thereto.

The flowmeter has a particularly compact design if the length of the measuring channel section is less than 40 mm for a nominal width of 110 mm or 80 mm.

The technical effort is further reduced if at least one reflector is held on the lower part of the measuring channel and/or on the upper part of the measuring channel, preferably by material bonding, for example by injection molding. For example, two reflectors can be provided on the upper part of the measuring channel and one reflector on the lower part of the measuring channel, so that a W-shaped signal path is created.

Mounting the ultrasonic sensors is particularly easy if they are mounted on inclined support surfaces of the upper part of the measuring channel or the bottom of the control housing.

This fastening is preferably realized through adhesive bonding or friction-locked by bracing.

Of course, the fastening can also be realized through soldering or the like.

The sensors are contacted with a main PCB via cables or via plastic moldings provided with contact paths.

Contacting according to another aspect of the invention is particularly simple when each sensor is contacted with a contact board, which in turn is connected to the PCB via the cables or the plastic moldings. The contact board can also be part of the plastic molding.

Fixing the sensors is particularly easy if the contact board is soldered or bonded to the sensor, with the sensor electrodes implemented in the area of a large surface remote from the bottom of the control housing or the top of the measuring channel (in other words, from the support of the sensor) and/or along a peripheral wall of the sensor. In such a concept, no contacting is provided in the support area of the sensors, so that the position can be fixed without regard to the actual contacting.

Relative positioning between the contact board and the sensor is particularly simple if the contact board is positively positioned, in particular via reference recesses and reference pins engaging therein, with reference to the control housing or the upper part of the measuring channel.

In one design example of the invention, the control housing has a housing cover that is designed with a display cover so that a display arranged in the control housing can be read through this cover.

Fixing the position of such a housing cover to the control housing is particularly easy if a multi-part sliding frame is used.

The assembly of the flowmeter can be further simplified if the upper part of the measuring channel, the lower part of the measuring channel and optionally also the control housing are connected to the flow channel via a bolt connection or a snap-fit connection.

Positioning the flowmeter on a pipeline is particularly easy if the control housing is tapered towards the connection piece of the flow channel, so that tool positioning is not hindered by the control housing.

In a particularly preferred design example, the measuring channel insert and optionally also the flow channel are made of plastic.

In a preferred design example of the invention, the battery is located on the large surface of the main PCB facing the measuring channel insert so that the top surface of the PCB away from it can be occupied by a display or transmission unit.

Depending on the type of battery (C-cell or D-cell) and the nominal size of the flowmeter, the battery can be arranged with its longitudinal axis transverse or parallel to the flow direction in the control housing.

As explained above, a display unit and a communication module can be accommodated in the control housing, with these being offset in relation to the main PCB at an approximately parallel distance to a housing cover.

In another very compact solution, the communication unit is designed with an antenna integrated into the control housing, which is covered by the housing cover. In this way, damage to the antenna is reliably prevented.

Other independent aspects of the invention are discussed below.

The measuring channel is preferably designed with an approximately rectangular cross-section, rounded in the corner area. Alternatively, however, other cross-sections such as an elliptical or oval cross-section can be used. An elongated cross-section with rounded narrow sides and parallel side walls (stadium) or other cross-sections optimized both in terms of production technology and hydrodynamics can also be realized.

The cross-section in the fluid inlet and in the fluid outlet should preferably be circular or oval, so that the profile can be manufactured in a simple manner. This cross-section then continuously transitions to the above-mentioned cross-section of the measuring channel in a transition area.

The sensors are preferably arranged in such a way that the signals are coupled in or out at an angle, i.e., at an angle to the longitudinal axis of the measuring channel.

In a particularly preferred design example of the invention, three reflectors are provided alternately between the sensors, resulting in an approximately W-shaped signal path. In one solution, the sensors and a reflector are arranged in such a way that roughly a V-shaped signal path is established.

These reflectors can be rounded according to the profile of the measuring channel and inserted flush into the measuring channel wall so that the flow is further optimized.

To optimize measuring channel routing, an input or output coupling surface of the sensors or a reflector surface of the reflectors can be concavely rounded so that the signal path is focused in the direction of the next component, for example the opposite reflector or sensor.

A reflector can be arranged in the area between the two sensors, whereby the measuring channel in this area has a smaller flow cross-section than in areas adjacent to the fluid inlet or fluid outlet.

The sensors and the respective associated reflector are preferably each formed in a tapered section of the above-mentioned transition area, the flow cross-section of which increases towards the measuring channel. For further equalization of the flow, the flow cross-section of the measuring channel can then be tapered again following the above-mentioned tapered section.

In one design example of the invention, the center-to-center distance between the two sensors is between 30 and 60 mm.

In one design example of the flowmeter, the sensors are bonded or clamped to a measuring channel insert forming the measuring channel, so that the technical effort is correspondingly reduced compared to conventional solutions.

In one design example, the material of the measuring channel insert is optimized with respect to flow routing and the material of the external flow channel is optimized with respect to protection of the flowmeter against external impacts. This is achieved, for example, by the flow channel and the measuring channel insert being made of different materials. In a preferred design example of the invention, the single- or multi-part measuring channel insert is made of plastic and the external flow channel is made of a metallic material.

In an alternative solution, a portion of the measuring channel insert, and the flow channel can be designed in one piece by a multi-component injection molding process or other injection molding process.

Instead of a commercially available contacting of the sensors via cables/leads—as explained—in one design example, contacting is realized via molded or spring bodies which are inserted into the flowmeter assembly. Such springs can also be designed as SMD spring contacts, for example, so that they assume a dual function with contacting and position fixing of the sensors or at least contribute to position fixing. The molded or spring bodies can be fastened by gluing or welding.

Figure 2:
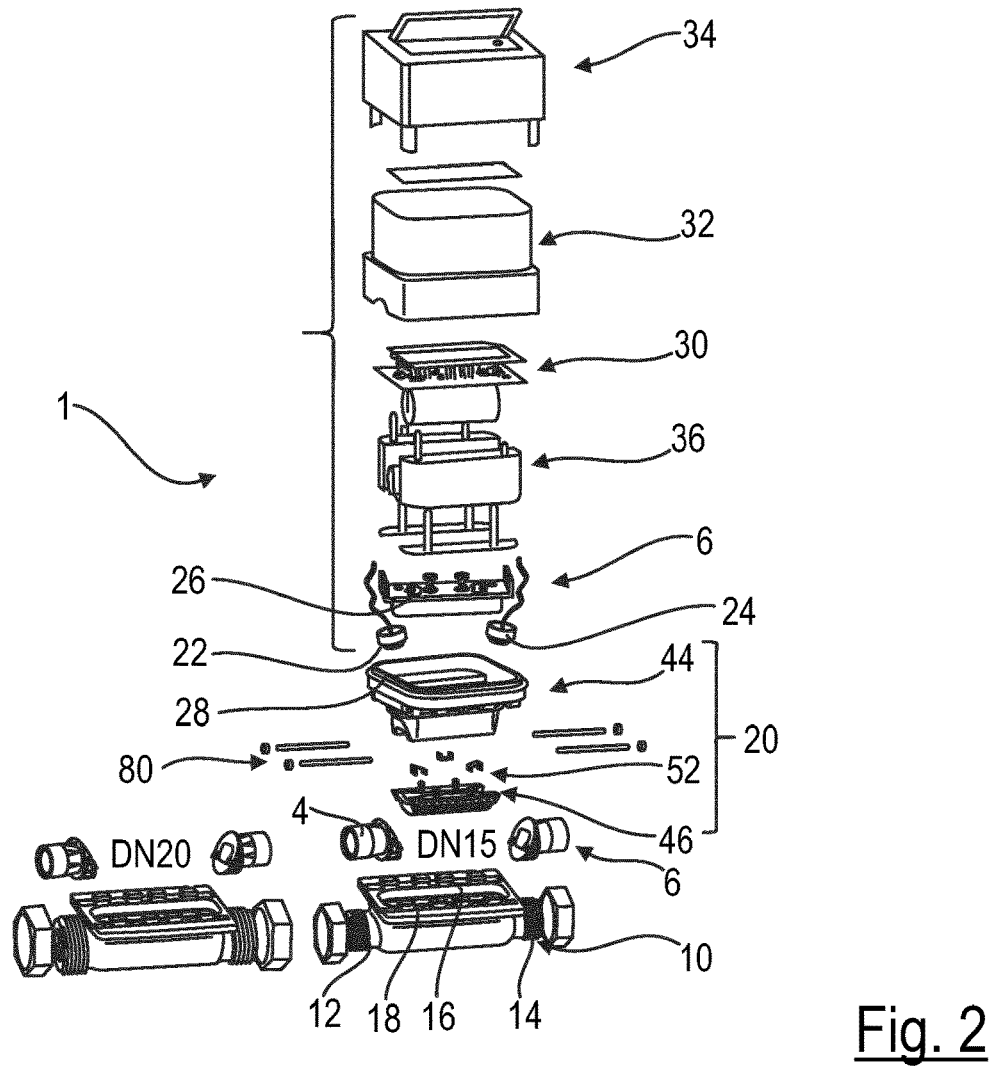
Figure 3:
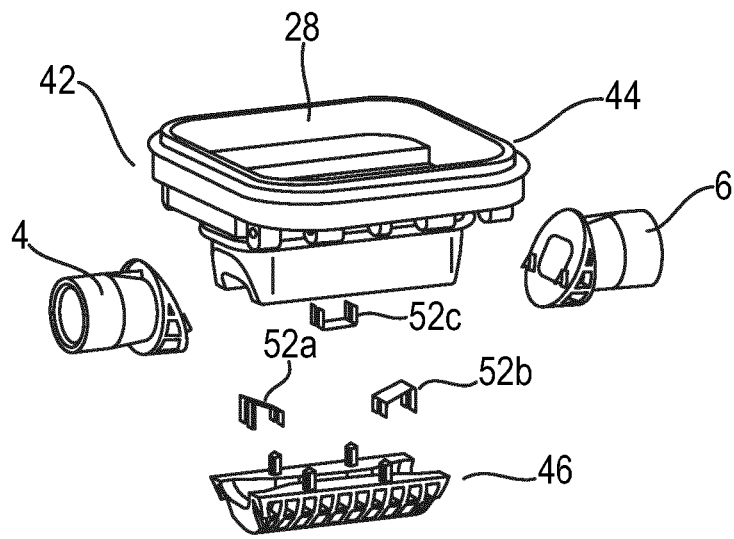
Figure 4:
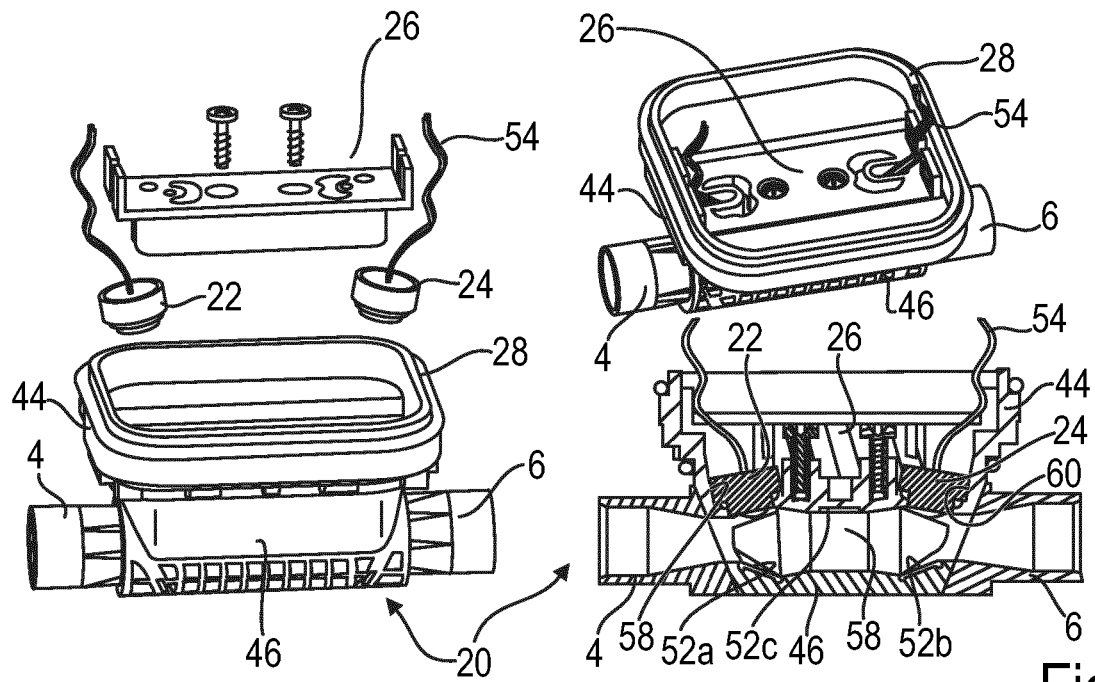
Figure 5:
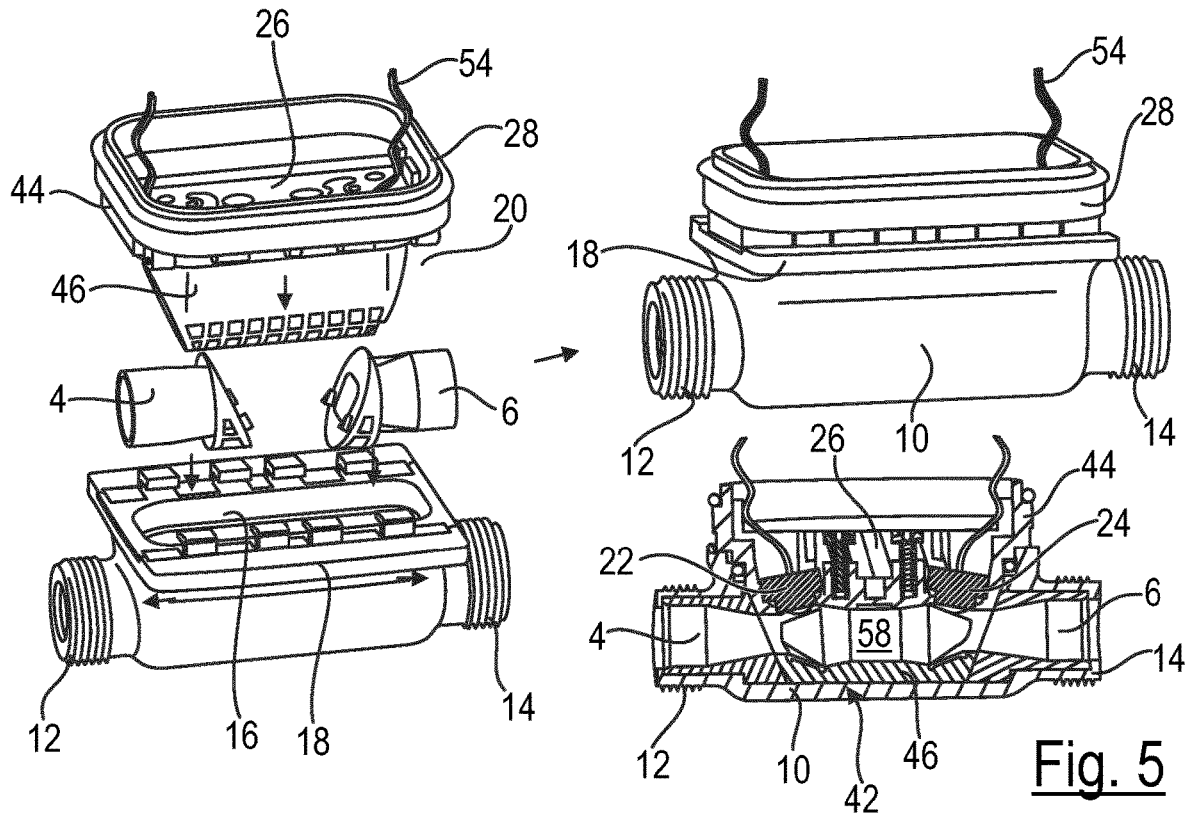
Figure 14:
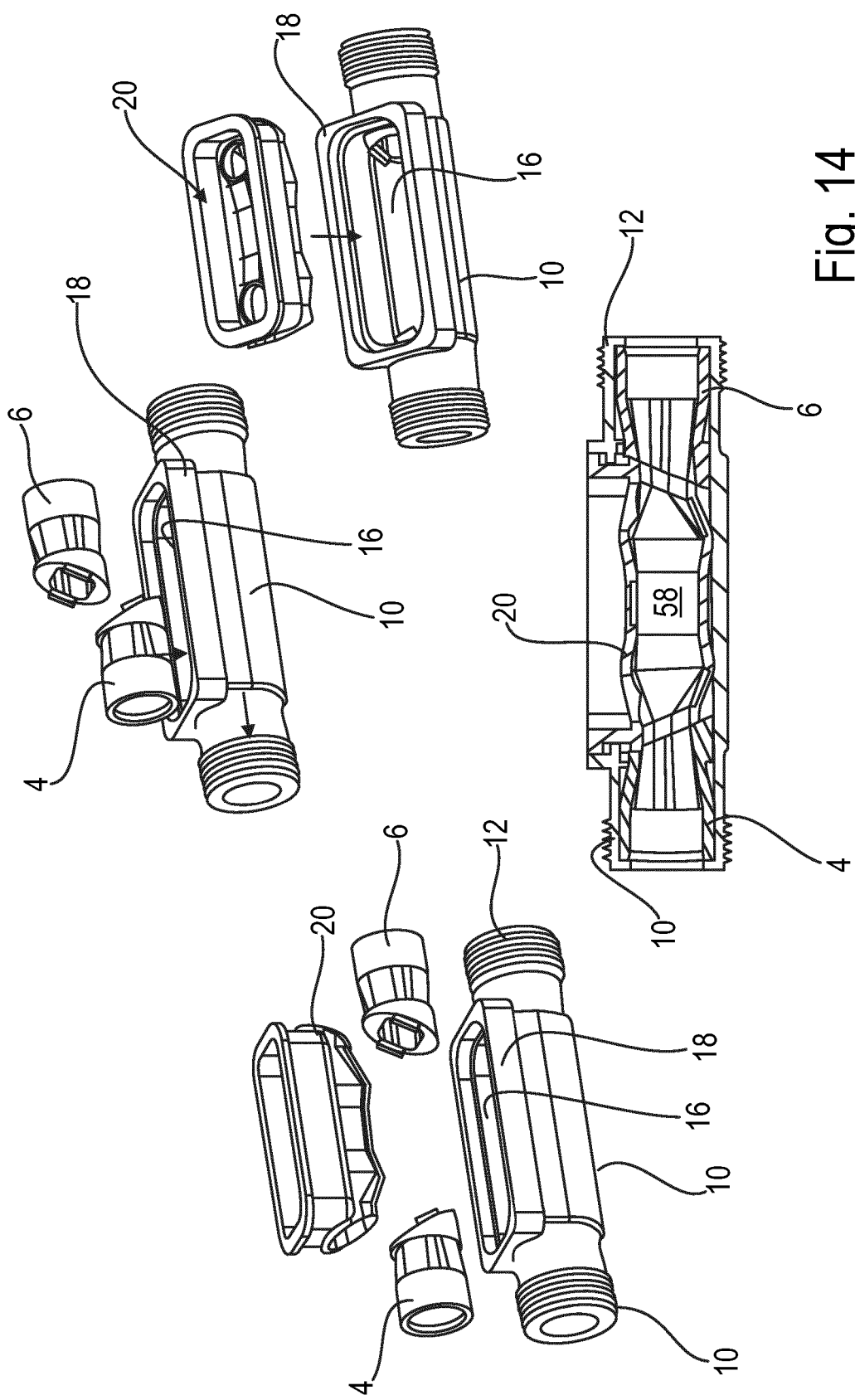
Figure 15:
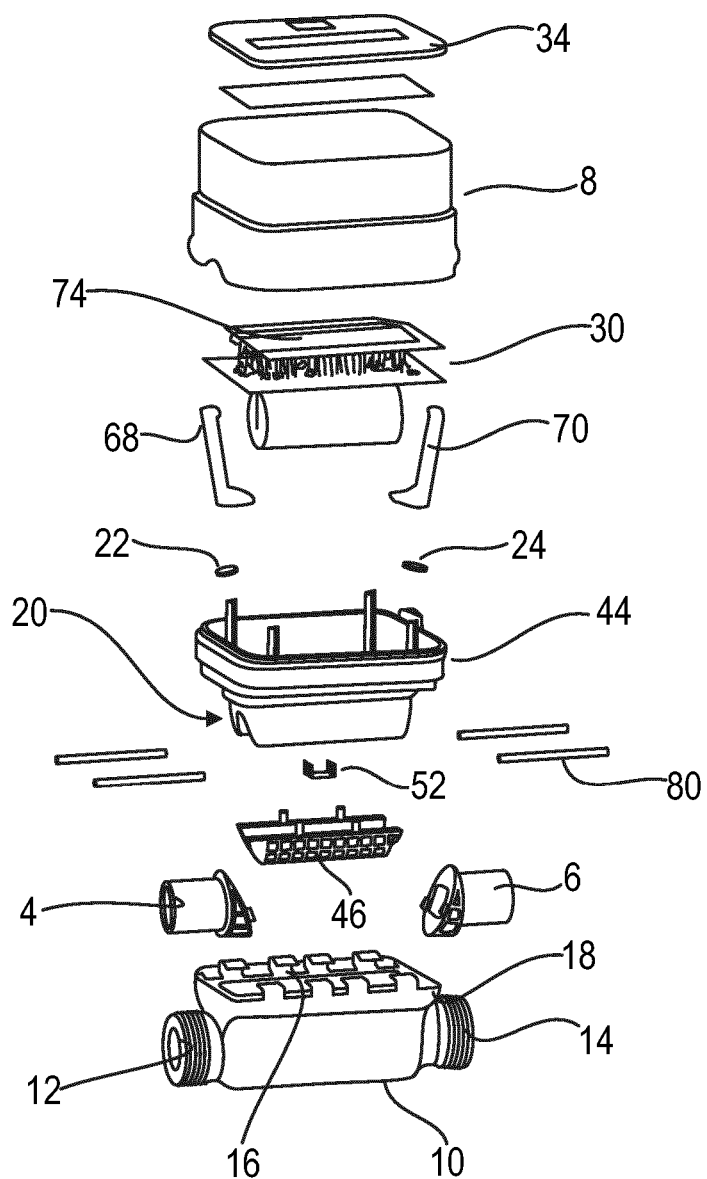
Figure 16:
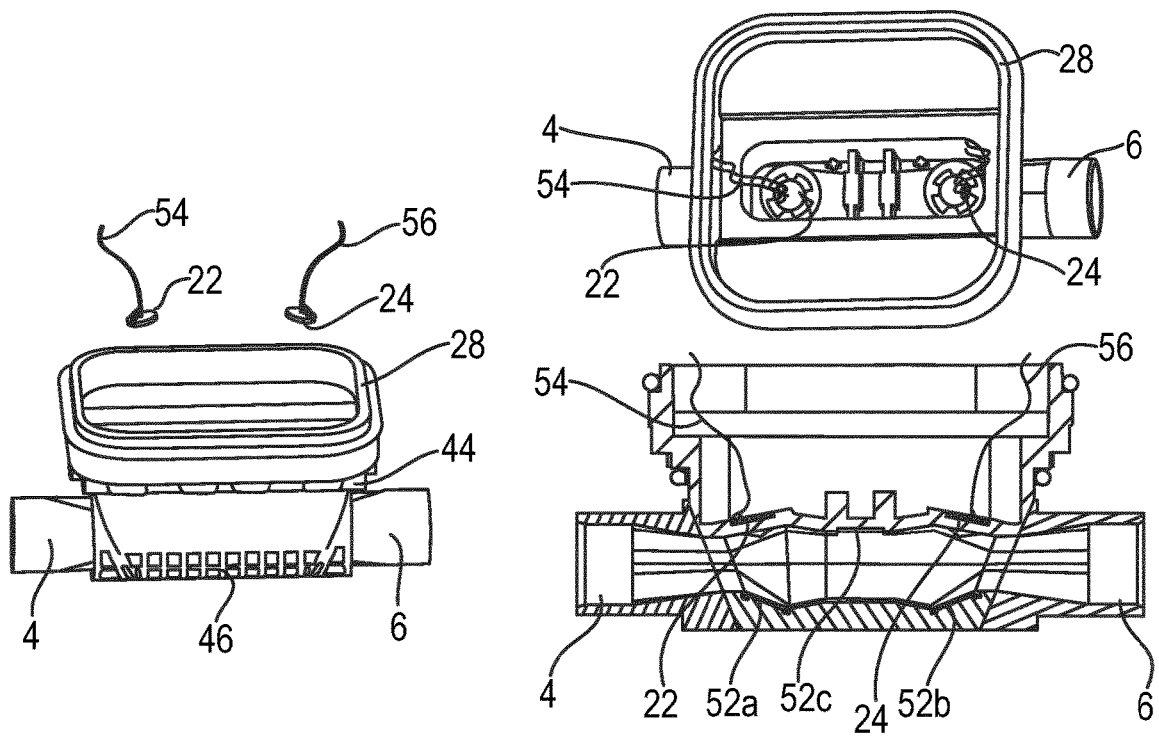
Figure 17:
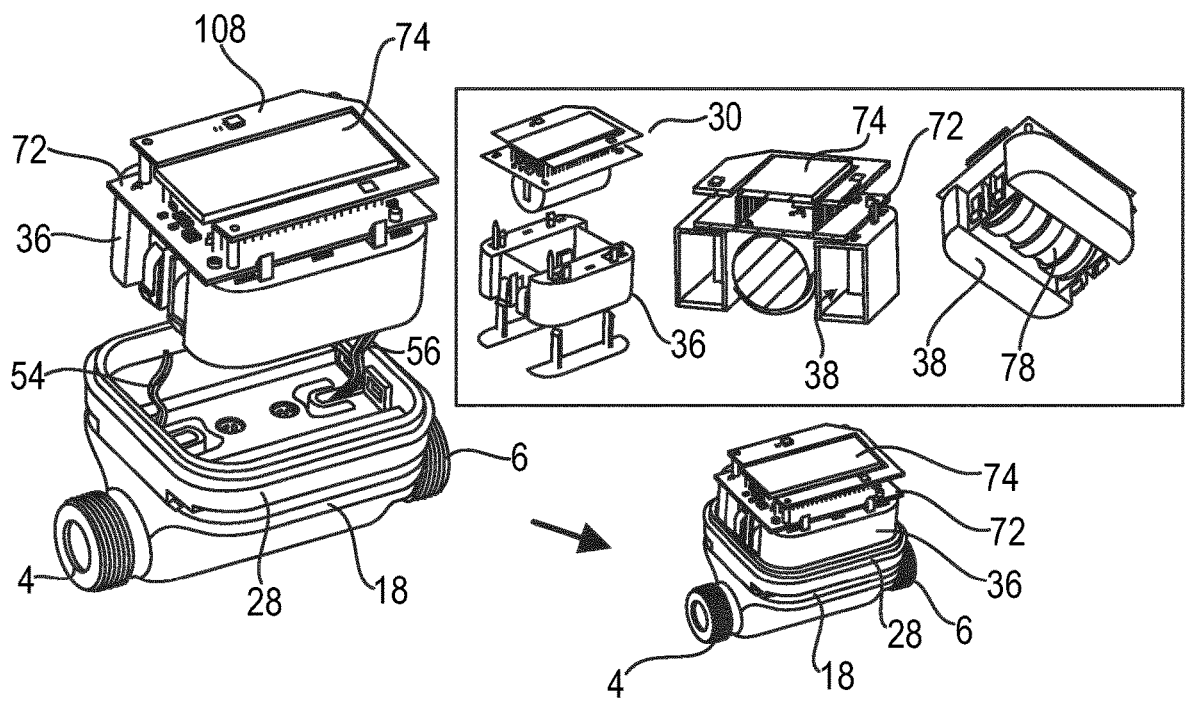
Figure 18:
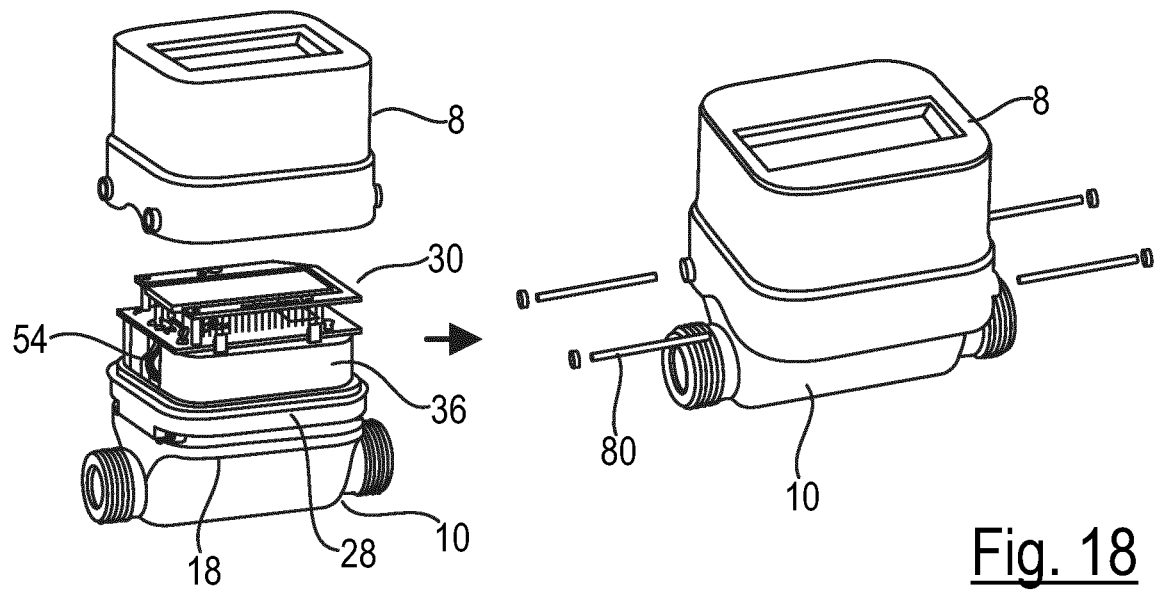
Figure 19:
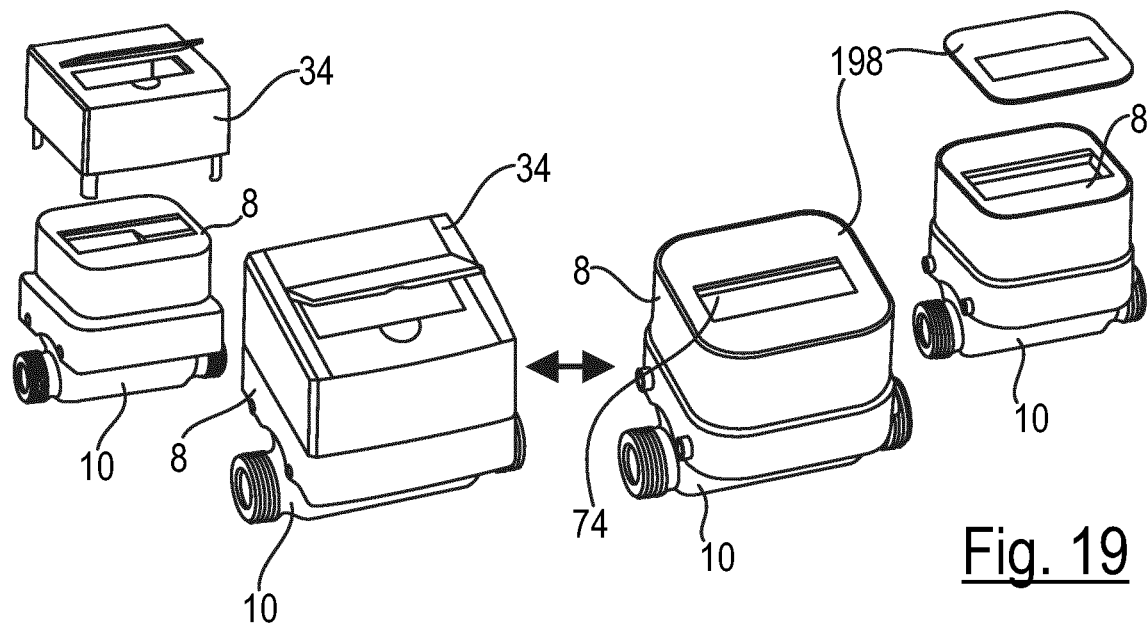
Figure 20:
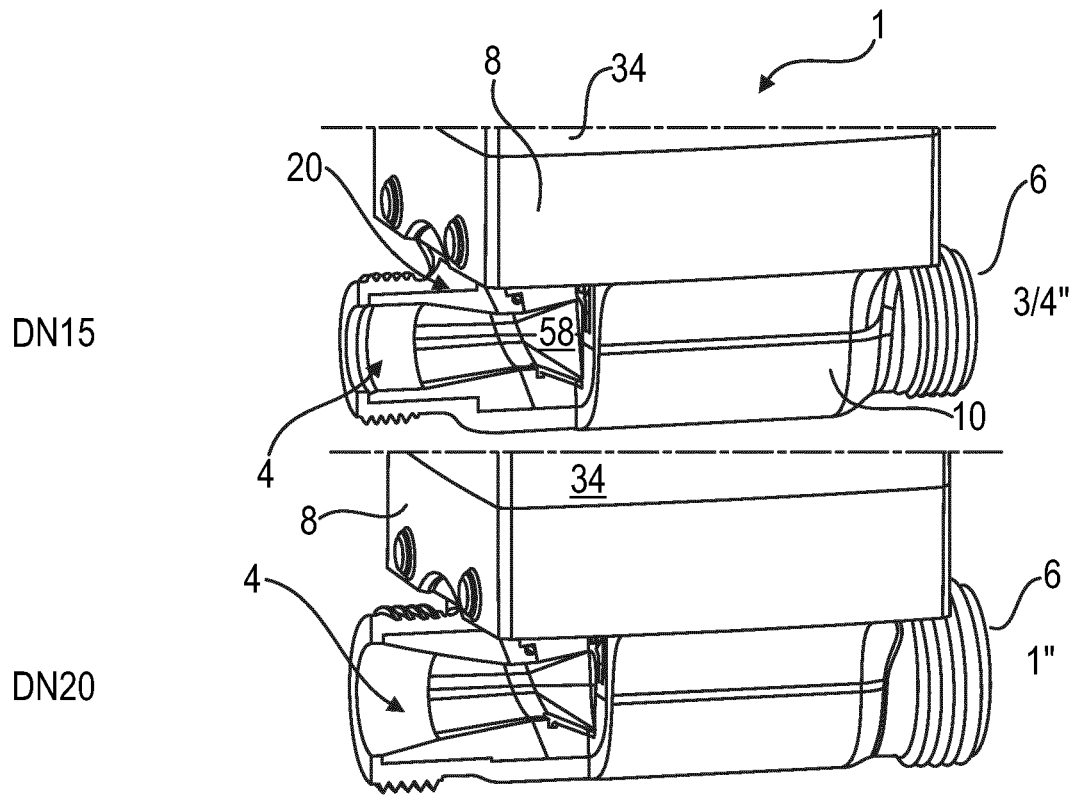
Figure 21:
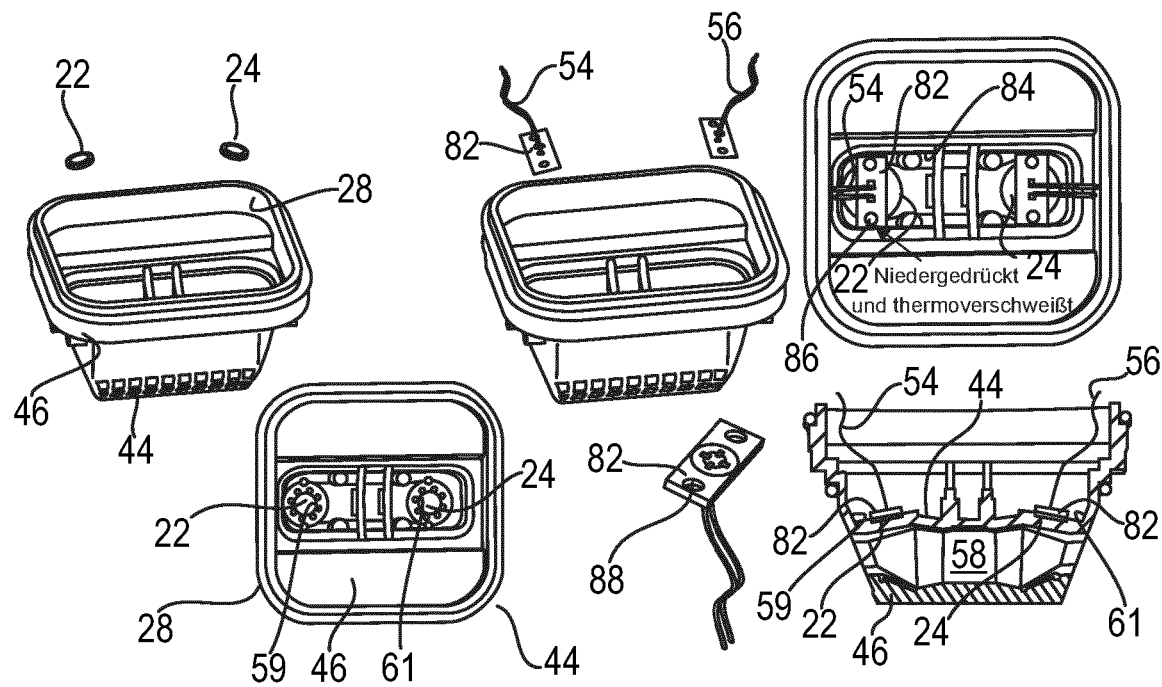
Figure 22:
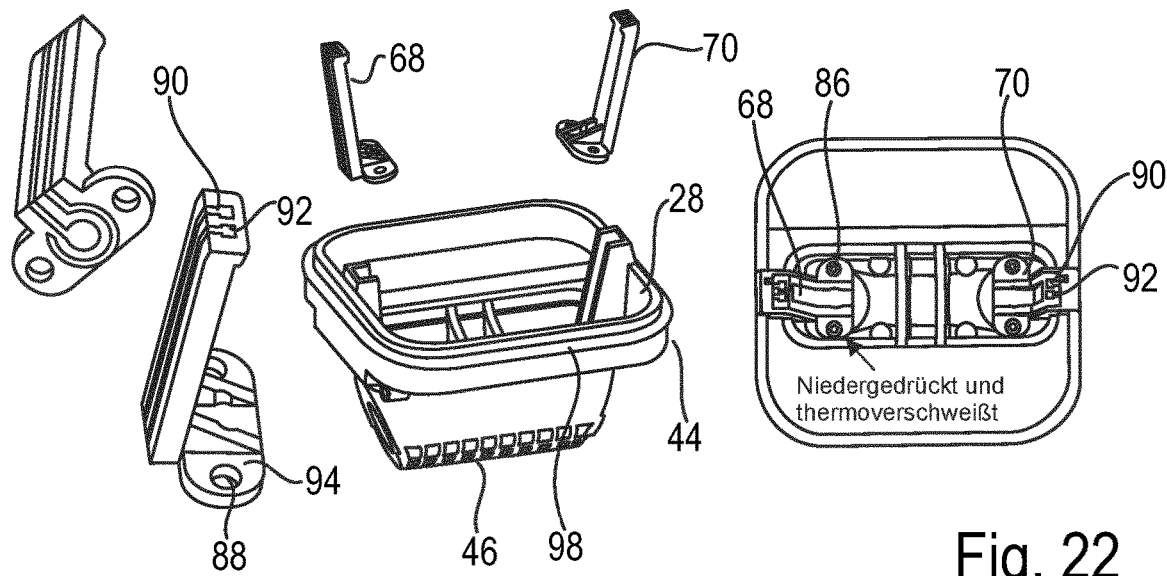
Figure 23:
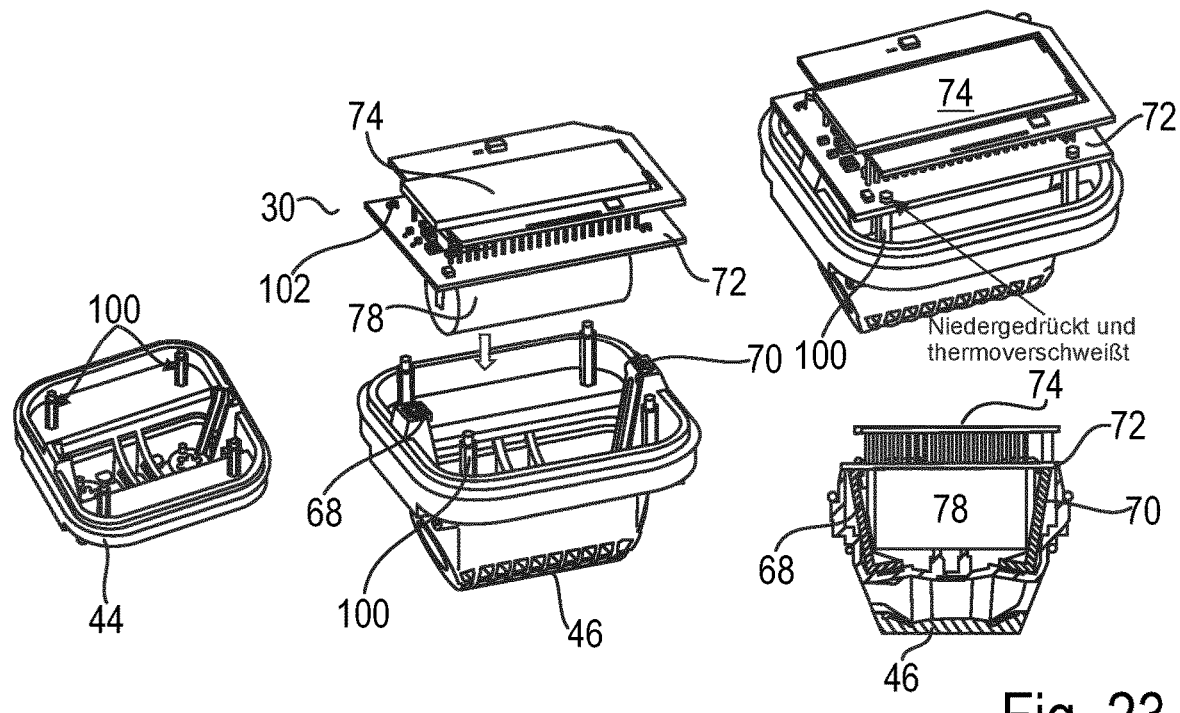
Figure 24:
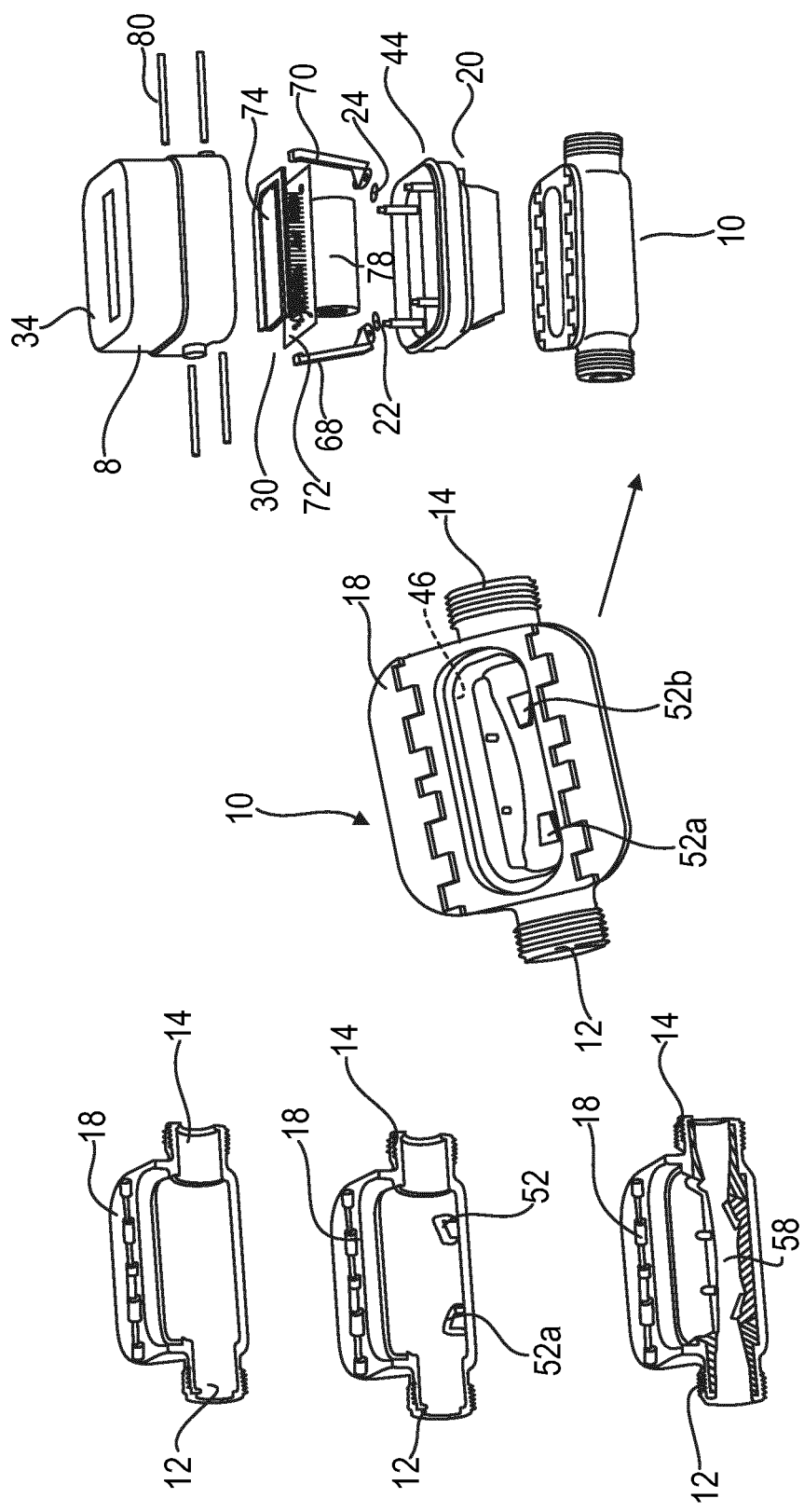
Figure 25:
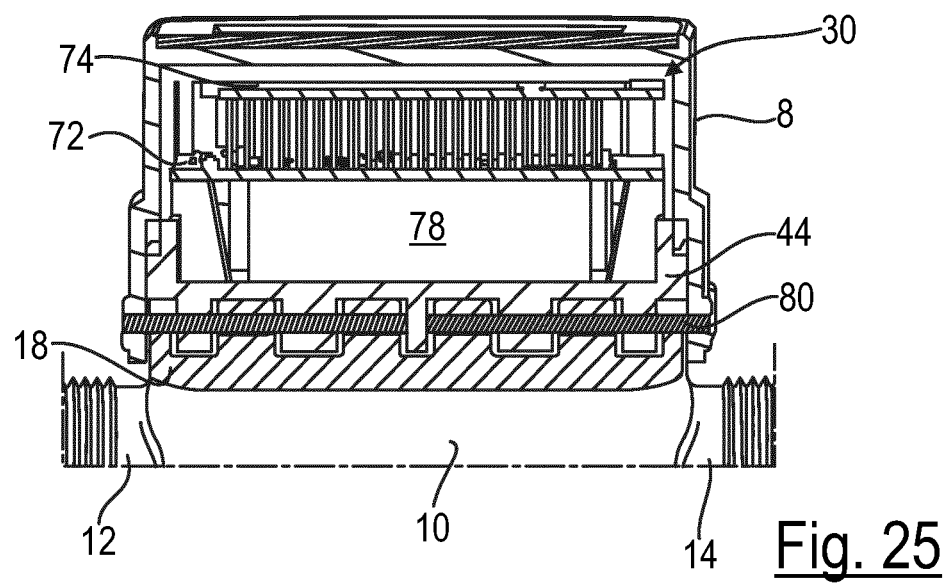
Figure 26:
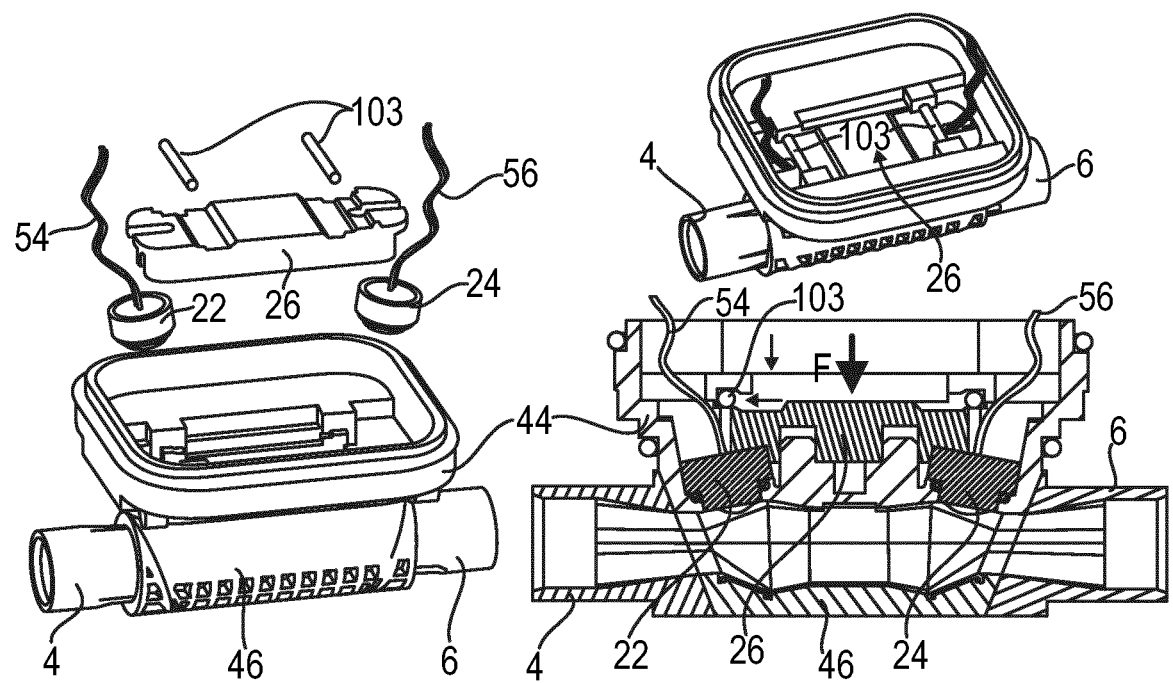
Figure 27:
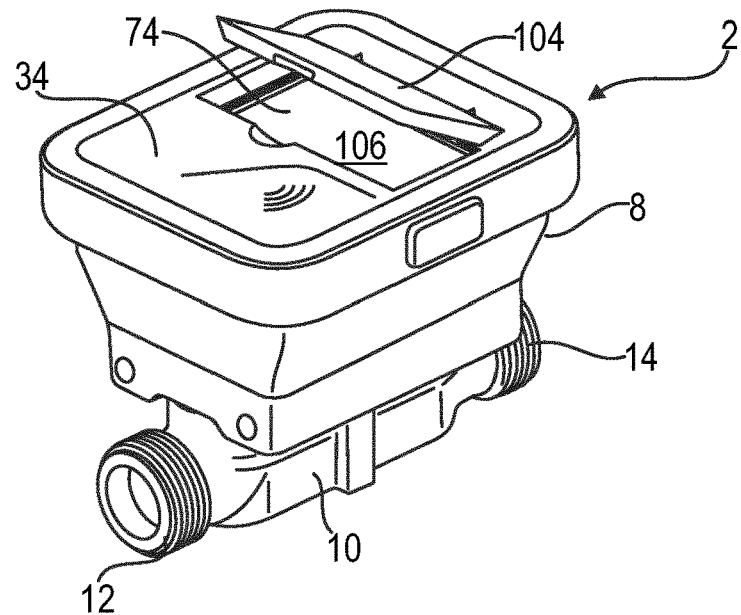
Figure 28:
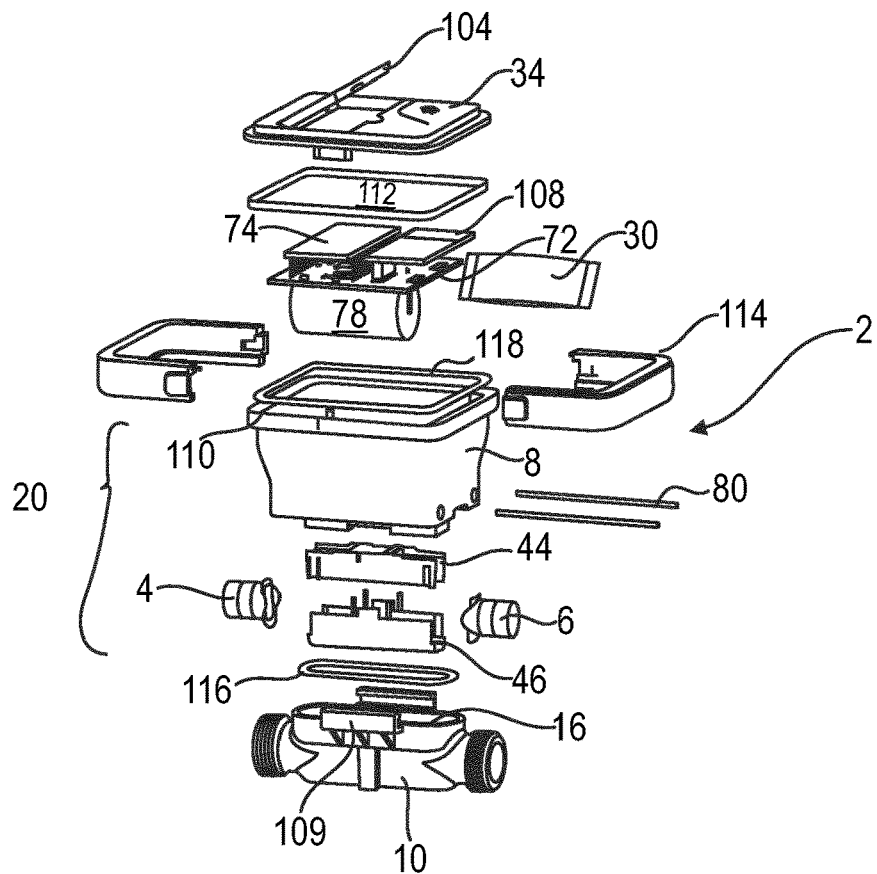
Figure 29:
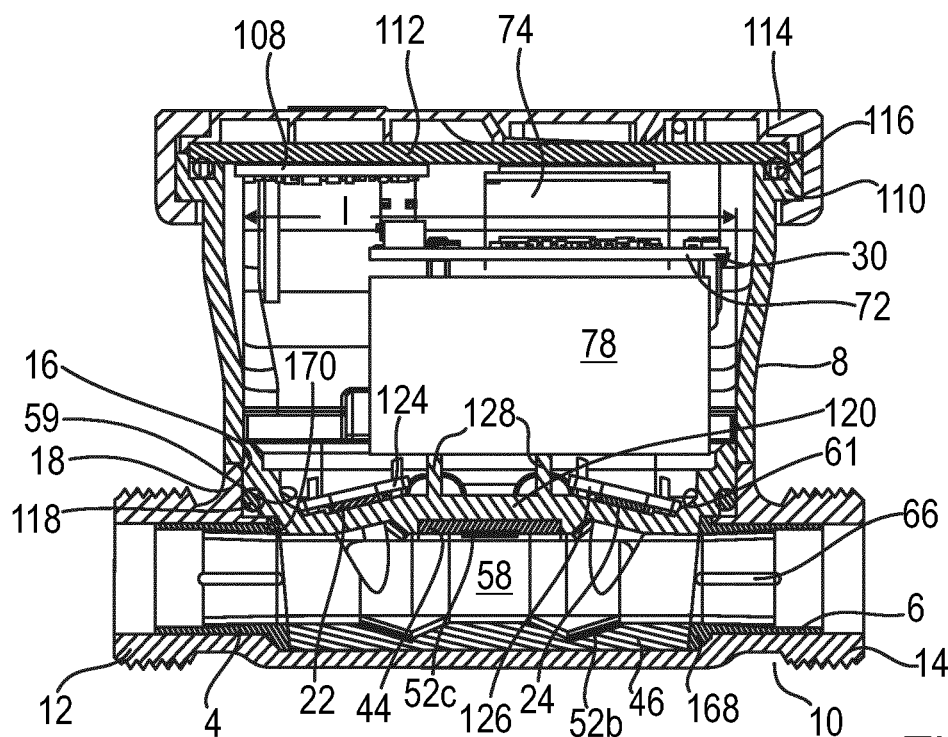
Figure 30:
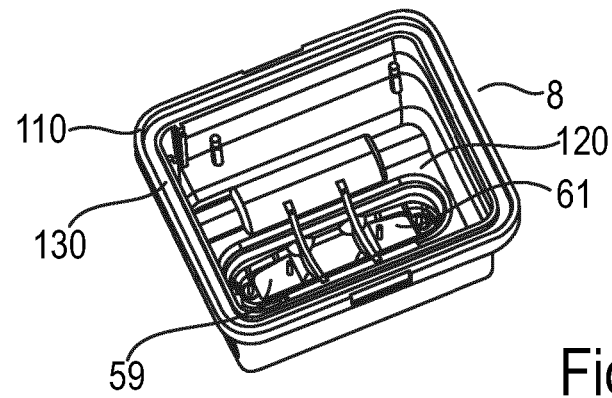
Figure 31:
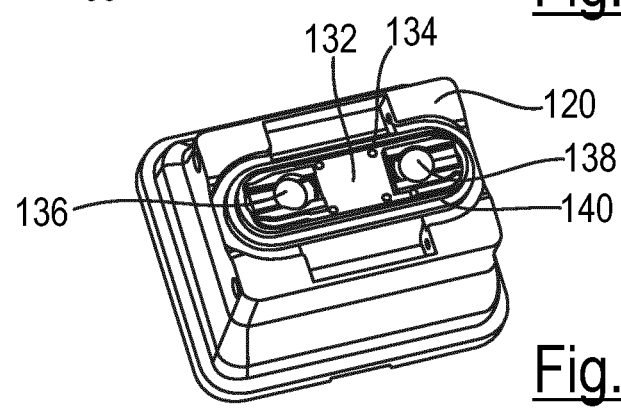
Figures 32, 33:
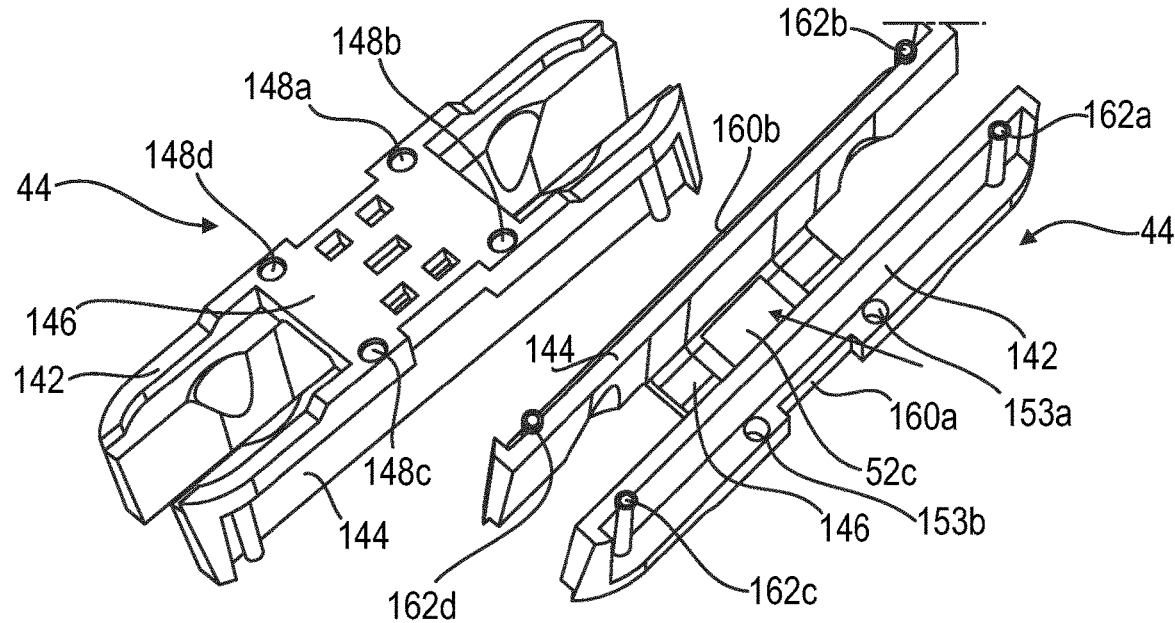
Figure 34:
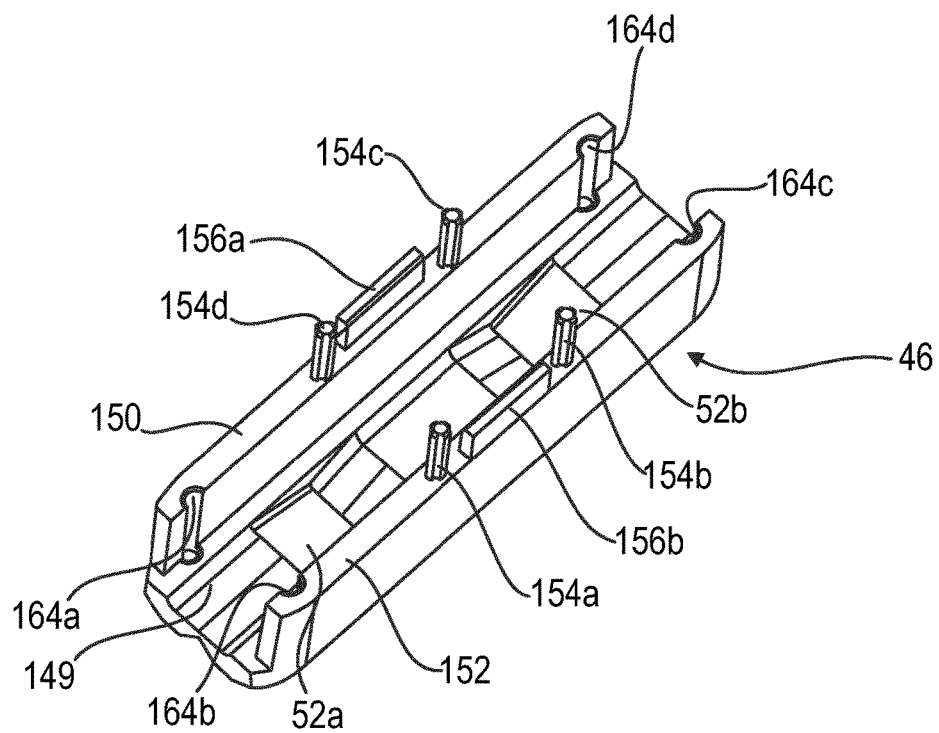
Figure 35:
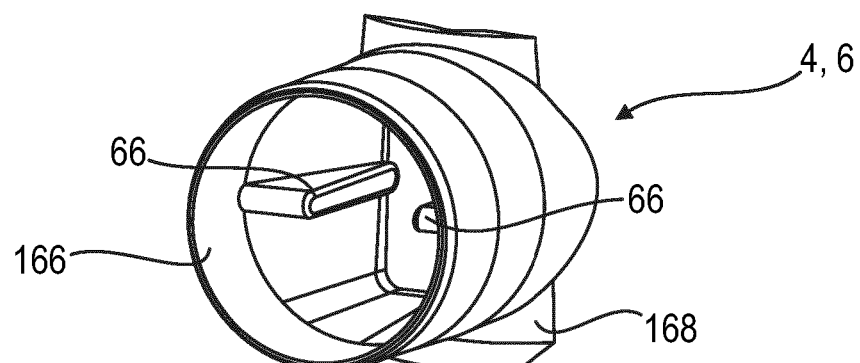
Figure 36:
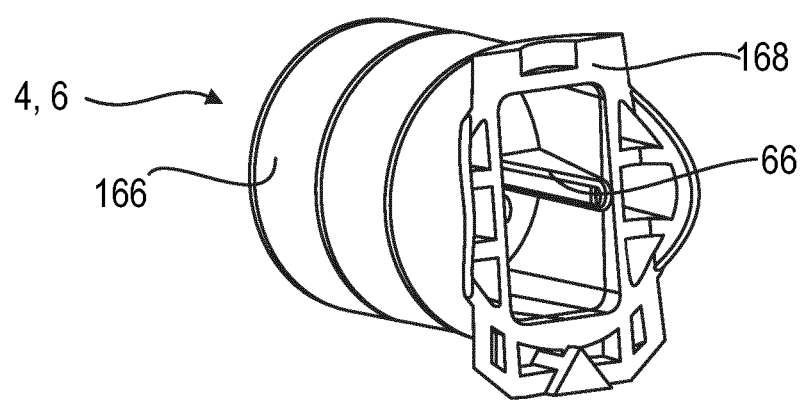
Figure 37:
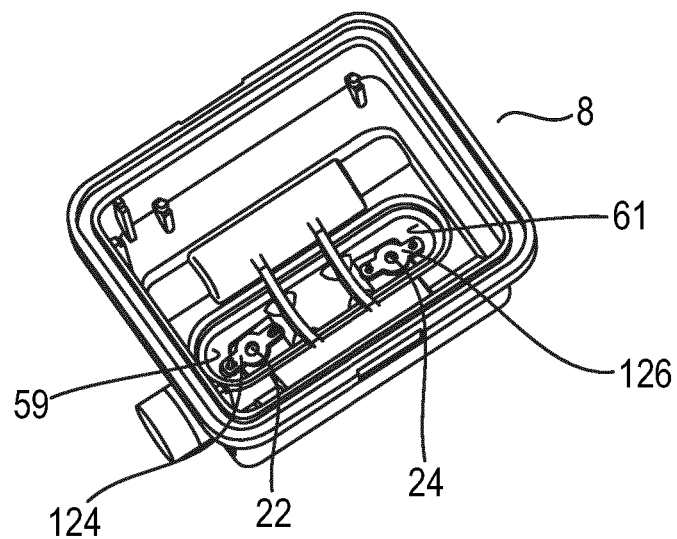
Figure 38:
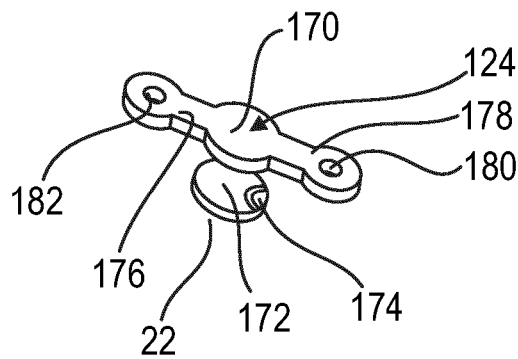
Figure 39:
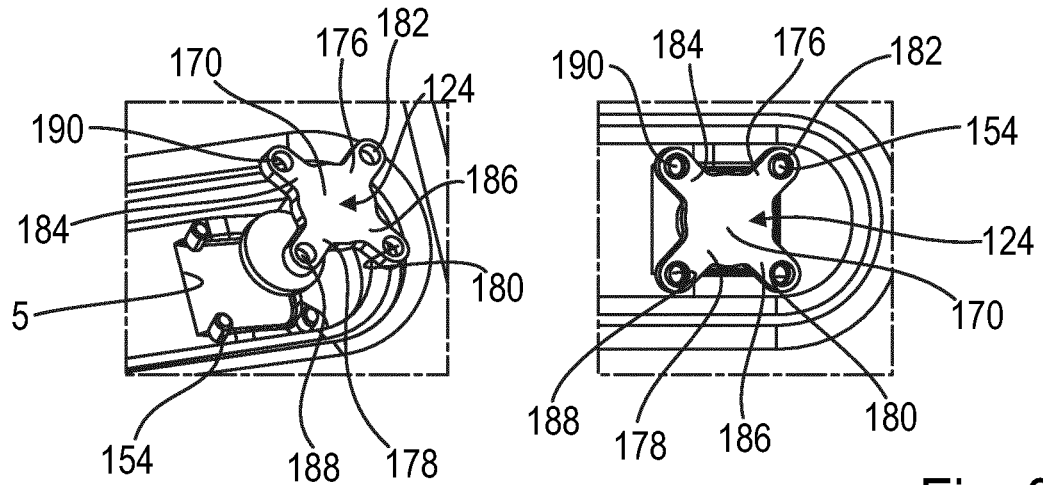
Figure 40:
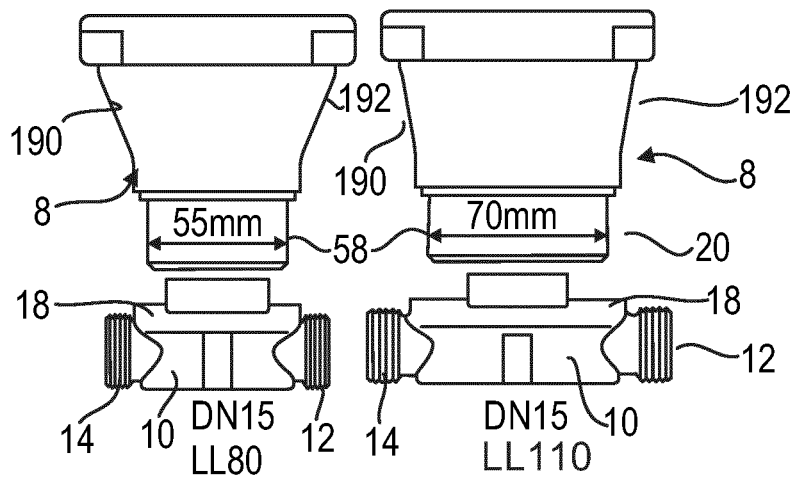
Figure 41:
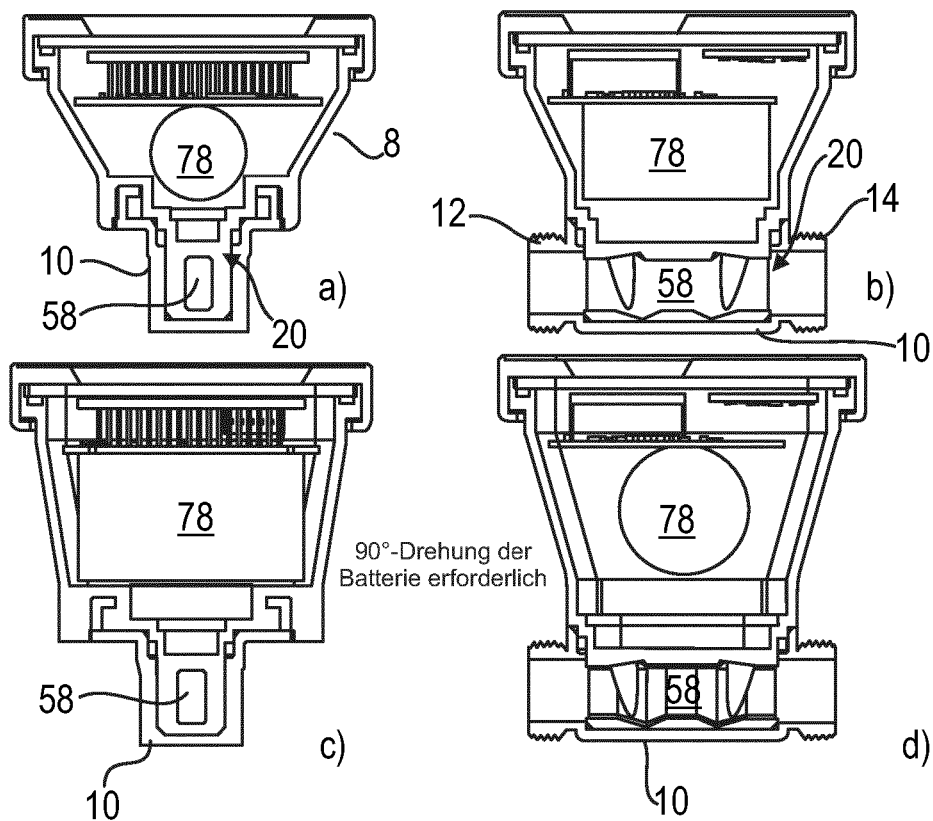
Figure 42:
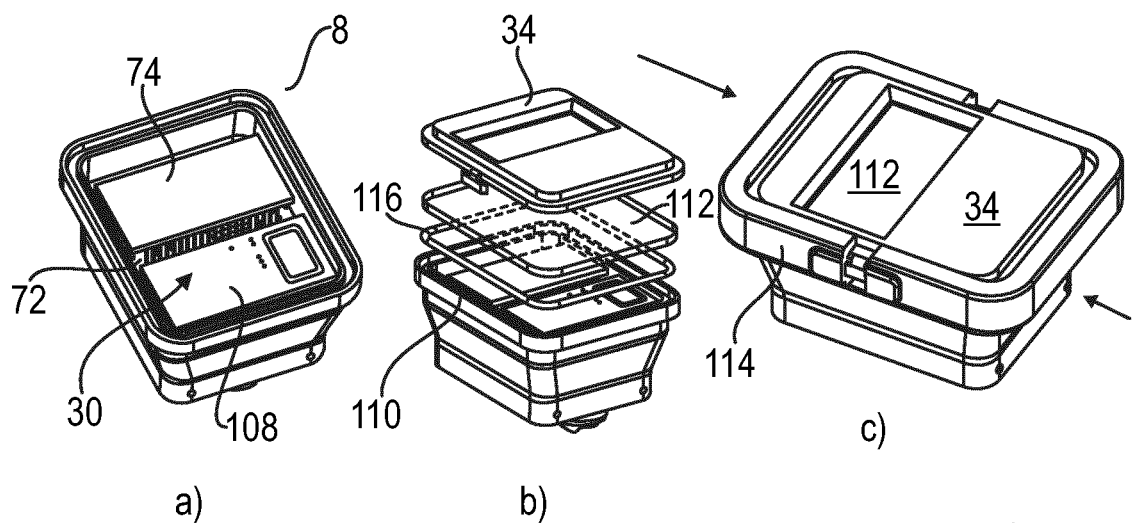
Figure 43:
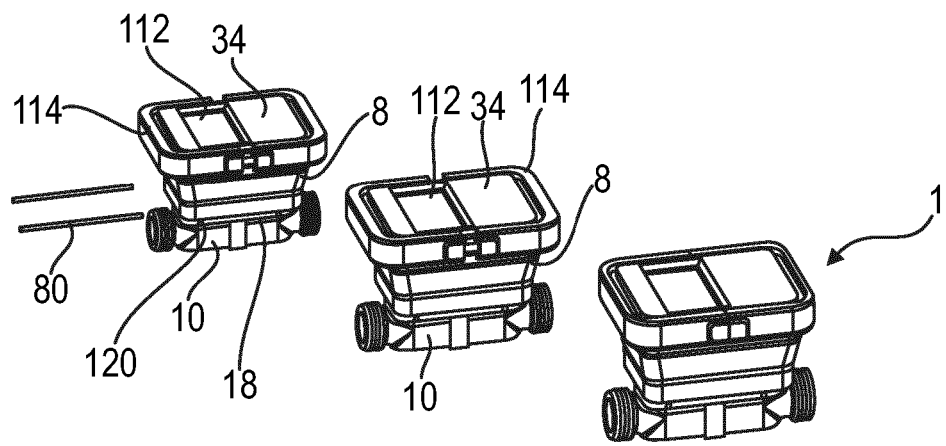
Figure 44:
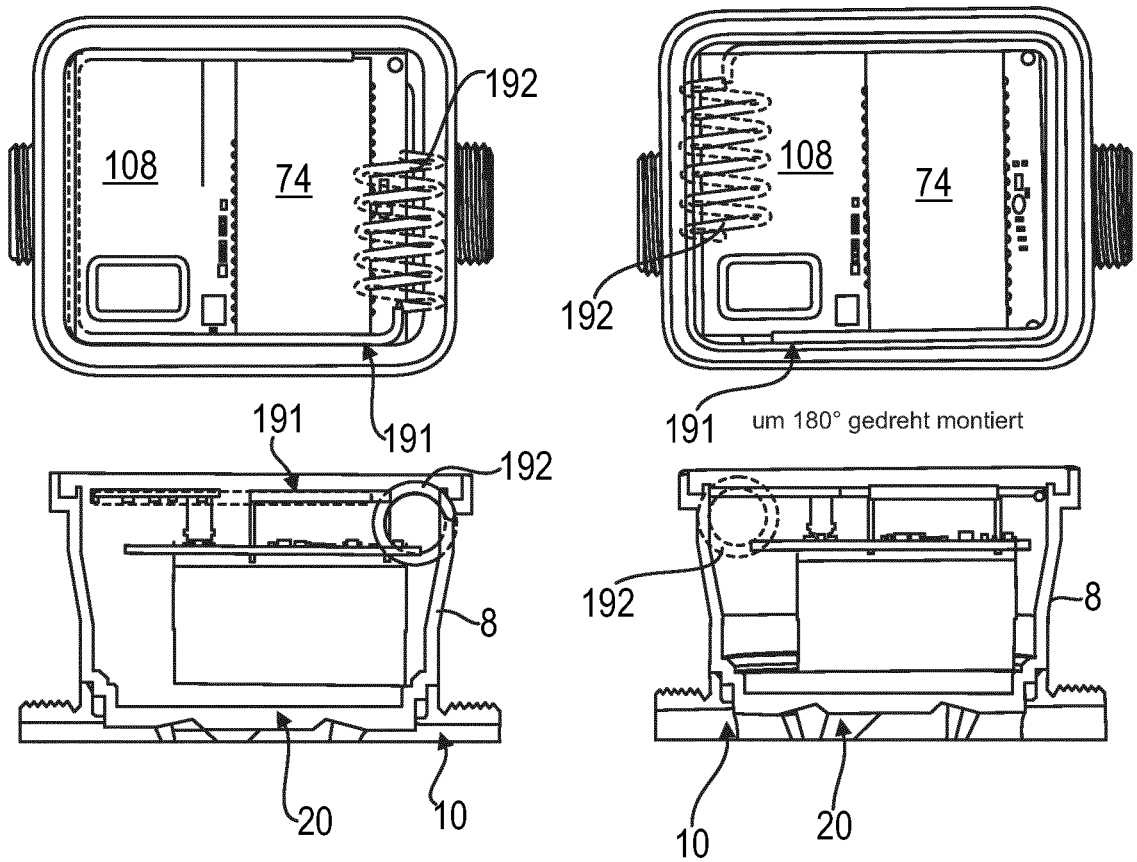
Figure 45:
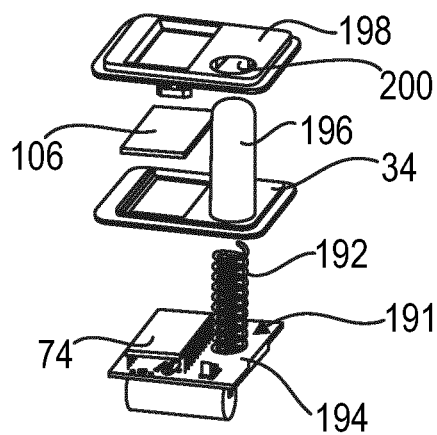
Figure 46:
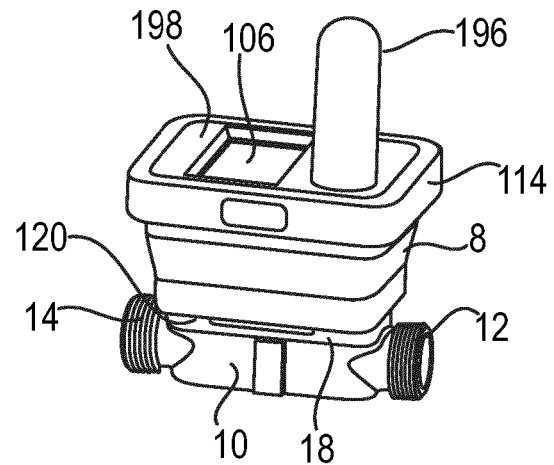
Figure 47:
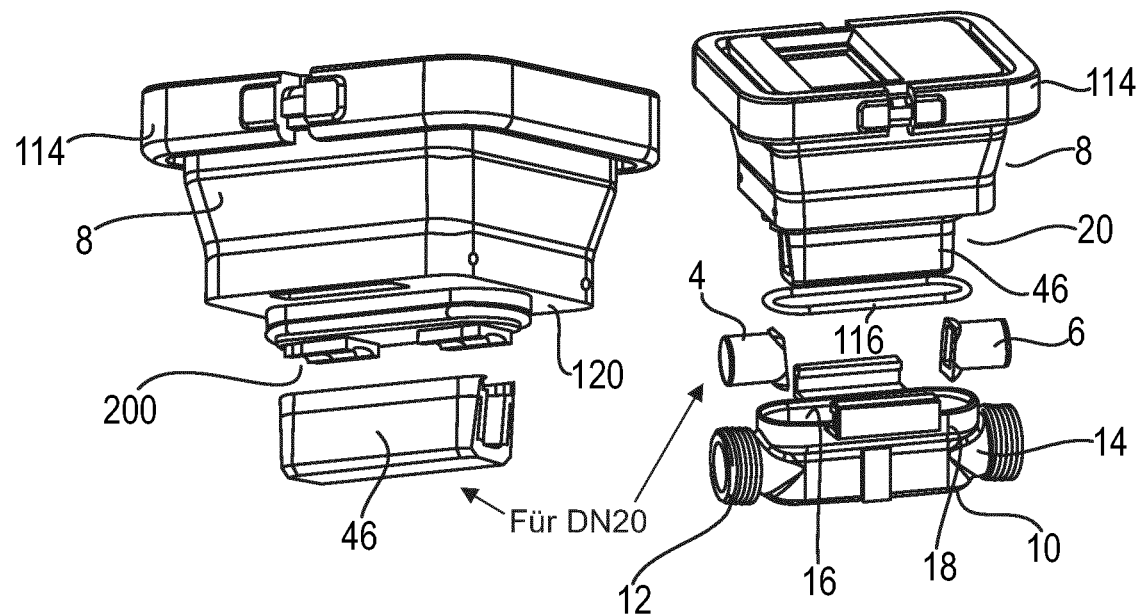
Figure 48:
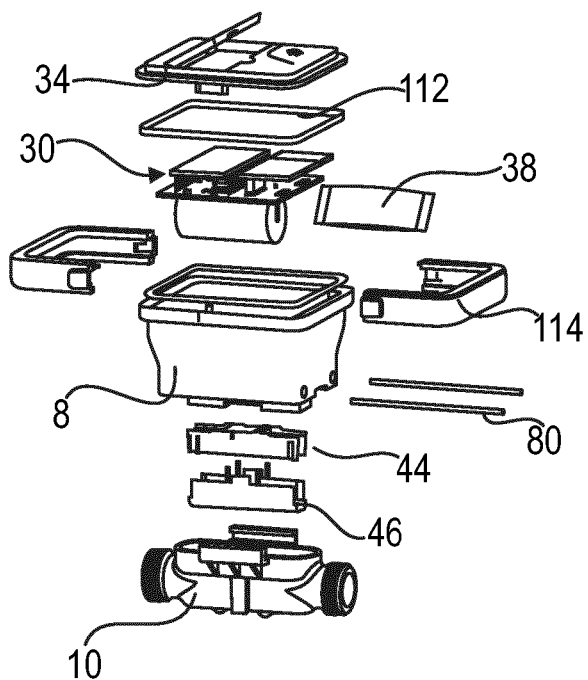
Figure 49:
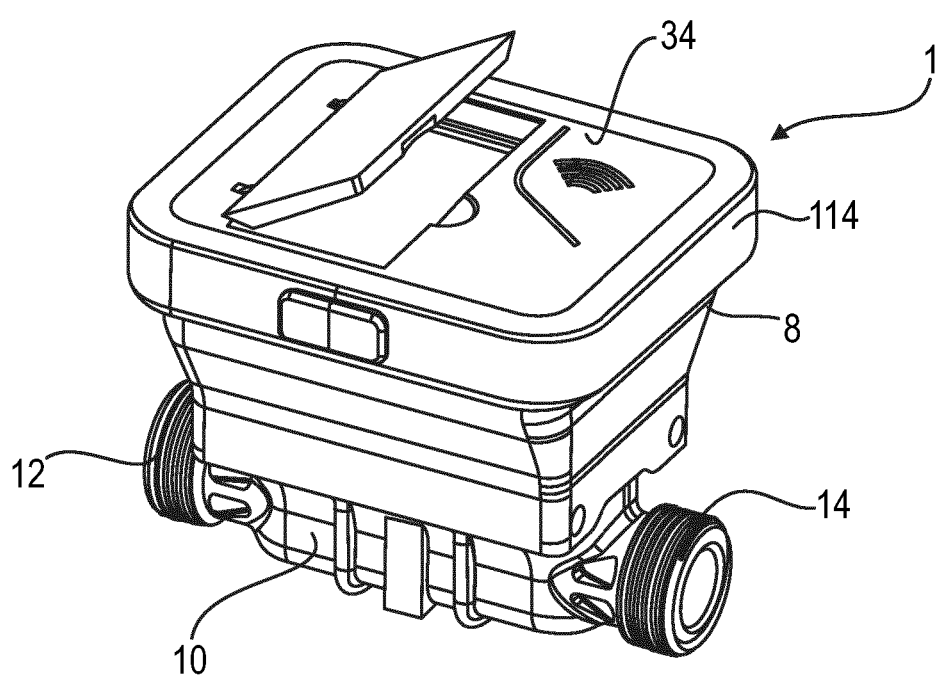

Preferred design examples of the invention are explained in more detail below using schematic drawings. The figures illustrate the following:

FIG. 1: three-dimensional view of a first design example of a flowmeter according to the invention;

FIG. 2: exploded view of the flowmeter from FIG. 1;

FIG. 3: detailed representation of a measuring channel insert of the flowmeter according to FIGS. 1 and 2;

FIG. 4: illustrations to clarify the sensor mounting in the measuring channel insert according to FIG. 3;

FIG. 5: the schematic diagram of measuring channel insert mounting according to FIGS. 3 and 4 in a flow channel;

FIGS. 6 to 13: schematic diagrams of possible cross-sections of a measuring channel of a flow meter according to the invention;

FIG. 14: design example of a flowmeter in which the flow channel is made of plastic;

FIG. 15: exploded view of a further design example of a flowmeter according to the invention;

FIG. 16: variant of the design example according to FIG. 15;

FIG. 17: design example of a flowmeter according to FIG. 16, with the design of a control unit shown;

FIG. 18: flowmeter according to FIG. 17 with the control housing in place;

FIG. 19: flowmeter shown in FIGS. 17 and 18 with means for identifying the flowmeter;

FIG. 20: schematic diagram of further design examples of a flowmeter according to the invention with different nominal diameters;

FIG. 21: assembly sequence for contacting sensors of another flowmeter design example;

FIG. 22: alternative design example in which moldings are used to contact the sensors;

FIG. 23: variant of a flowmeter in which the control unit is fixed in position on an upper part of the housing using support pins;

FIG. 24: simplified manufacturing steps for the production of a flowmeter with a flow channel made of plastic;

FIG. 25: cross-section through a flowmeter to illustrate the positional fixation of a control housing with respect to a control channel;

FIG. 26: alternative way of fixing the position of the sensors within a measuring channel upper part or a control housing;

FIG. 27: three-dimensional representation of another flowmeter design example;

FIG. 28: exploded view of the flowmeter according to FIG. 27;

FIG. 29: sectional view of the flowmeter shown in FIGS. 27 and 28;

FIGS. 30, 31: individual representations of a sensor housing of the flow meter according to FIG. 29;

FIGS. 32, 33: individual representations of a measuring channel upper part of the flowmeter according to FIG. 29;

FIG. 34: individual representation of a measuring channel lower part of the flow meter according to FIG. 29;

FIGS. 35, 36: individual representations of inserts of the flowmeter according to FIG. 29;

FIG. 37: representation corresponding to FIG. 30 with sensors mounted;

FIGS. 38, 39: details of contacting sensors in a flowmeter according to the invention;

FIG. 40: schematic diagram of two flowmeters with different nominal diameters and tapered housings;

FIG. 41: mounting possibilities of different batteries in flowmeters according to the invention;

FIG. 42: mounting of components on the display side of a flowmeter according to the invention;

FIG. 43: mounting steps for fixing a measuring housing to a flow channel;

FIGS. 44, 45, 46: schematic diagrams for the possibility of positioning antennas of a communication module;

FIG. 47: views of a further design example of a flowmeter according to the invention, and FIGS. 48, 49: design example of a flowmeter with a flow channel made of plastic.

FIG. 1 shows a three-dimensional view of a design example of a flowmeter 1 according to the invention with a flow channel 10 forming a measuring housing, the fluid inlet and fluid outlet formed thereon, and a control housing 8 attached thereto, which accommodates a control unit of the flowmeter 1. Accordingly, the flowmeter 1 is characterized by a very compact design, with the number of installed components being minimal.

The flowmeter 1 according to the invention, which will be explained in more detail below, is characterized by a very good gearing factor (ps/l) (this factor stands for the increase in flow in liters (l) in a time difference T (ps); a high gearing factor means that one obtains a higher repeatability for a measurement than with a lower value), so that signal noise (signal jitter) can be reduced or at least compensated for at low flow rates. This is determined by a predetermined sensor distance as well as a suitable flow velocity in the flowmeter 1.

Furthermore, this is designed in such a way that the pressure loss during the flow is minimal. This is achieved, among other things, by the fact that the measuring channel described below is designed with continuous transitions. Furthermore, the measuring channel is designed in such a way that no pockets, undercuts or other obstacles are formed where air bubbles could collect.

The flowmeter 1 described below with the measuring channel optimized in terms of signal acquisition and hydrodynamics is characterized by optimal signal quality with sufficient signal strength without signal noise and interference.

Furthermore, standard ultrasonic sensors (transducers) can be used, so that the manufacturing price is minimal. The flowmeter 1 can be manufactured according to standard manufacturing methods.

FIG. 2 shows an exploded view of the flowmeter 1, with particular reference being made in the following to a measuring channel insert 20 and the measuring channel formed by it. As shown, the flowmeter can be designed for pipelines with nominal diameters of DN15, DN20, DN25 or DN32. The flowmeter can also be provided in other sizes.

Using to the following FIGS. 1 to 24, some basic components of different design examples of a flowmeter 1 according to the invention are explained first. Further details will then become apparent from the more detailed description of further design examples.

As can be seen from the exploded view shown in FIG. 2, the flowmeter 1 has the flow channel 10—also called the housing, which in the design example shown is made of brass or a metallic alloy.

This flow channel 10 has connection pieces 12, 14, through which the flowmeter 1 can be connected to a pipeline carrying the fluid. As will be explained in more detail below, the flow channel 10 has a radial recess 16 that opens into a flange 18 to which a control housing 32 can be attached, the design of which will be explained in more detail below. A measuring channel insert 20 can be inserted through the radial recess 16. In the design example shown, it carries two ultrasonic sensors 22, 24, which are suitably attached to the measuring channel insert 20. In the design example shown, for example, the attachment is implemented using a sensor holder 26. The actual control unit 30 for actuation, signal supply, and power supply of the sensors 22, 24 is arranged on a housing flange 28 of the multi-part measuring channel insert 20. This control unit is accommodated in a control housing 32, which is closed off or covered at the top by a housing cover 34 (view according to FIG. 2). The control unit 30 is supported by a support structure 36, which also supports desiccant 38.

As can be seen from FIGS. 1 and 2, a display 40 arranged on the control unit 30 can be read through the cover 34—this will be discussed in more detail below.

As shown in FIG. 2 at the bottom left, the flow channel 10 or the housing formed by it can be provided with different nominal diameters, whereby the actual control unit 30 with the control housing 32 and the sensors 22, 24 is designed independently of the nominal diameter. Measuring channel insert 20 must be modified for adaptation only.

According to the detailed illustration in FIG. 3, the measuring channel insert 20 is formed with a measuring channel section 42 consisting of a measuring channel upper part 44 and a measuring channel lower part 46. On the inlet and outlet side, an inlet insert 4 and an outlet insert 6 are provided, each designed according to the nominal diameter of the pipeline. The measuring channel upper part 44 is further designed with the housing flange 28, to/in which the control housing 8 and the sensors 22, 24 are attached/inserted.

Three reflectors 52a, 52b, 52c are inserted into the peripheral wall of the measuring channel insert 20 in the design example shown, so that a W-shaped signal path 64 is formed.

The individual parts of the measuring channel insert 20 may, for example, be made of a fiber-reinforced plastic or other plastic material. Of course, it is also possible to manufacture from metallic material.

FIG. 4 shows the measuring channel insert 20 according to FIG. 3 in the partially assembled state, whereby the two sensors 22, 24 are also shown, which are fastened in the housing flange 28 using the sensor holder 26, whereby signal lines 54, 56 of the sensors 22, 24 are led through the sensor holder 26 to the control housing 32, which is not shown.

FIG. 4 at the bottom right shows a section through the partially assembled measuring channel insert 20. It can be seen that the sensor holder 26 is screwed and braced to the measuring channel upper part 44, with recesses/pockets 59, 61 being formed in the measuring channel upper part 44 into which the sensors 22, 24 extend with their coupling surfaces. One of the reflectors 52a, 52b is implemented opposite each of the sensors 22, 24. The third reflector 52c is located between the two sensors 22, 24, resulting in a W-shaped signal path 64, as explained. In principle, dual sensors can also be used, so that two signal paths can be realized. A V-shaped signal path is also conceivable. The profile of the measuring channel delimited by the measuring channel insert 20 will be discussed in more detail below.

According to FIG. 5, the multi-part measuring channel insert 20, which is preferably made of plastic, is inserted into the flow channel 10, which forms a sturdy housing. This sturdy housing can be made of a metal casting, for example. First, the two inserts 4, 6 forming the fluid inlet and the fluid outlet are inserted into the recess 16 of the flange 18, and then the actual measuring channel section with the measuring channel upper part 44 and the measuring channel lower part 46 is inserted in the radial direction so that the housing flange 28 of the measuring channel insert 20 is seated on the flange 18 of the flow channel 10.

In the illustrated design example, the connection pieces 12, 14 of the flow channel are designed with a thread or other connection elements, so that the flowmeter 1 can be attached to a pipeline in a simple manner.

Figure 6:
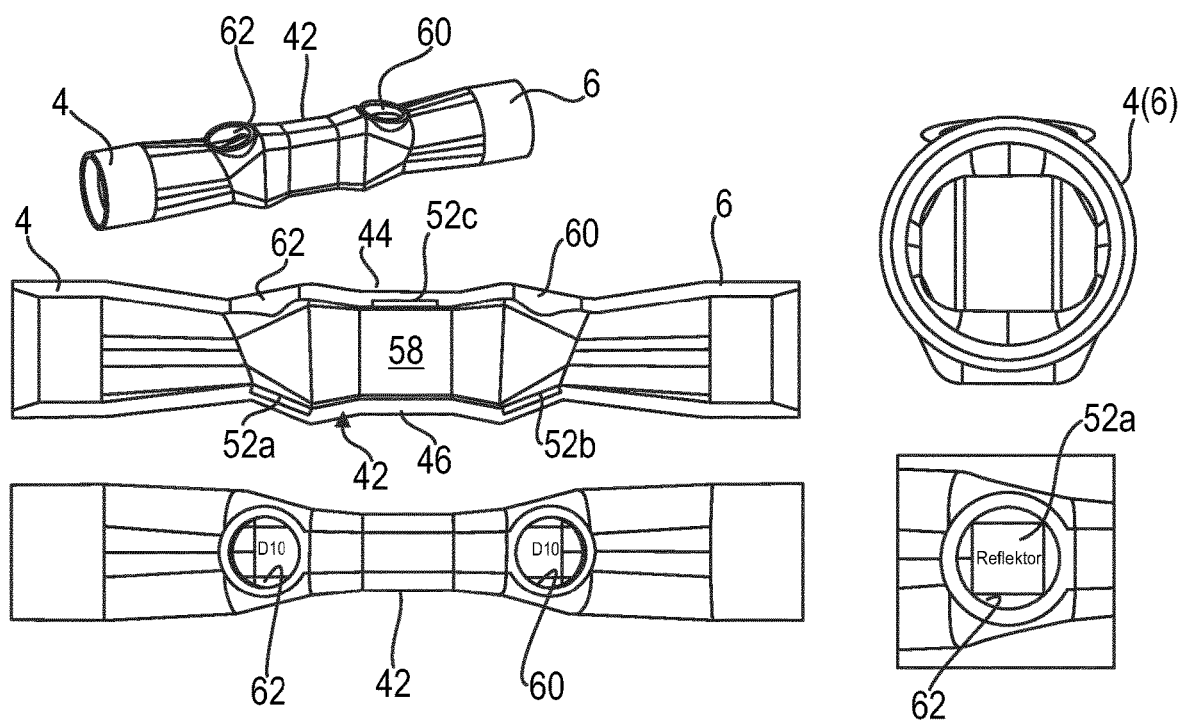

FIG. 6 shows views of the measuring channel design formed by the components described above. This measuring channel 58 is designed without undercuts or other flow obstructions forming turbulence, although cross-sectional changes are implemented between the inlet and the outlet in a selected manner to optimize flow routing.

In the sectional view, it can be seen that the measuring channel 58 is implemented with an approximately circular cross-section in the inlet and outlet areas, which can be selected according to the pipeline. The actual measuring channel section 42 with a rectangular cross-section (see top right in FIG. 6) is implemented in the center. According to the invention, a reduction of the flow cross-section can be provided in the area between the measuring channel section 42 and the inlet or the outlet, respectively, so that the fluid flow is accelerated in this area and thereafter the cross-section of the measuring channel 58 is again enlarged compared to this reduction. This equalizes the fluid flow in the actual measuring channel 58 and reduces turbulence so that signal noise is minimized.

In the design example shown, the respective transition area in which the flow cross-section is reduced is formed by a two-sided and sectional tapering (in particular as seen in vertical section) of the measuring channel insert 20. Specifically, this cross-sectional taper is formed in the transition region between the fluid inlet insert 4 and the fluid outlet insert 6 to the actual measuring channel section 42, which in turn is delimited by the measuring channel upper part 44 and the measuring channel lower part 46. Through the two recesses 60, 62 implemented in the measuring channel section 42, the measuring beams are coupled in and out, respectively. A reflector 52*a*, 52*b* is then inserted flush into each diametrically opposite wall of the tapered section.

The third reflector 52*c* is located between the two recesses 60, 62. In this area in the illustrated design example, the clear width of the measuring channel 58 is again reduced compared to the largest diameter of the tapered section, so that the flow is slightly accelerated in this region.

In the detailed view shown in the lower right of FIG. 6, it can be seen that the reflector 52*a* is positioned opposite the associated recess 60, 62. In the illustrations according to FIG. 6, it can be seen very clearly that the respective transitions between the tapered areas towards the inlet insert 4 and towards the outlet insert 6 and towards the measuring channel section 42 are designed continuously without any jump-like changes in cross-section, so that optimum flow is ensured.

Figure 7:
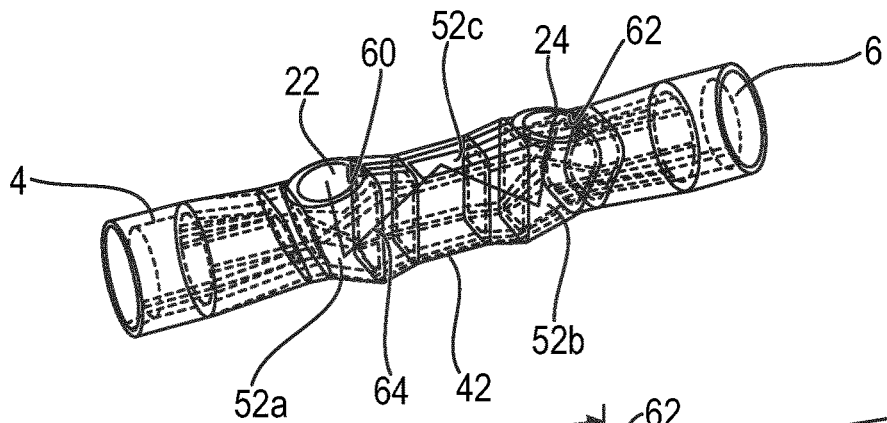

FIG. 7 shows a three-dimensional schematic diagram of the channel design, indicating the positioning of the two sensors 22, 24 and the three reflectors 52*a*, 52*b*, 52*c*. As explained, the inclined position of the sensors 22, 24 and the positioning of the reflectors 52*a*, 52*b*, 52*c* described above set up a W-shaped signal path 64, whereby this is designed in such a way that the measurement signals are reliably routed from the transmitter to the sensor (receiver) receiving the reflected measurement signal.

Figure 8:
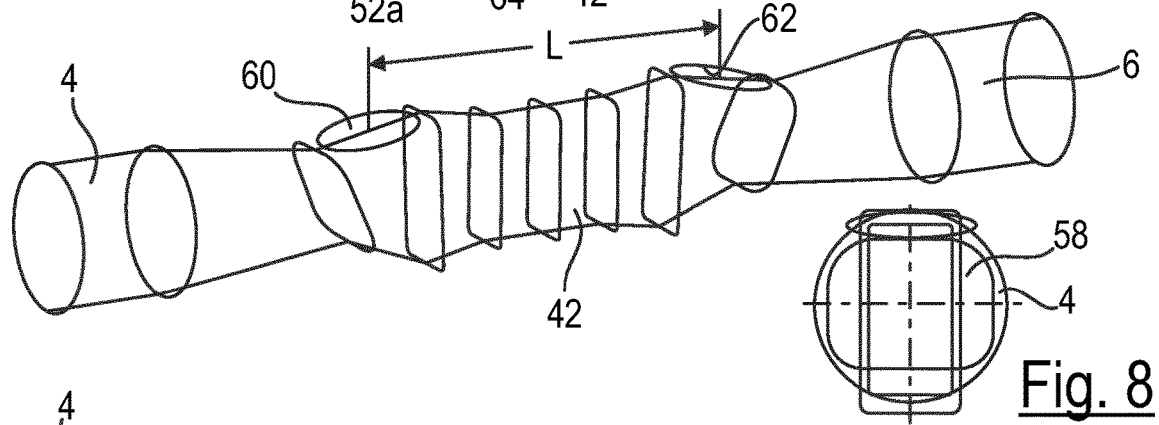
Figure 9:
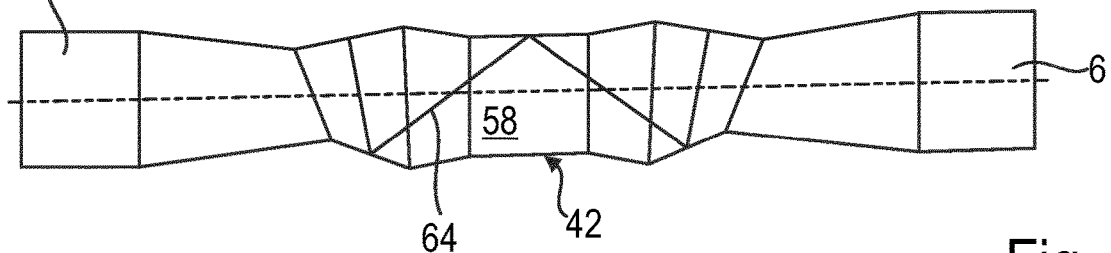

The cross-sectional profiles of the channel design are again illustrated in FIG. 8. Accordingly, the cross-section of the channel in the inlet and outlet area is approximately circular and then tapers towards the transition area, with the circular cross-section changing into an elongated, rectangular cross-section in this transition area, in which the vertical axis has a greater extent than the transverse axis running perpendicular to the drawing plane. The recesses 60, 62 are also circular. The contact surfaces of the reflectors 52*a*, 52*b*, 52*c* are pocket-shaped so that the reflectors 52*a*, 52*b*, 52*c* can be inserted flush into the measuring channel 58.

In the illustration according to FIG. 8, it can also be seen very clearly that the clear width is smaller in the area of the measuring channel section 42, so that the cross-section of the measuring channel 58 increases slightly towards the two transition areas. As explained, in these two transition areas, the cross-sectional profile changes continuously from the circular inlet insert 4 and outlet insert 6 to the approximately rectangular measuring channel 58, which is rounded in the corner area, with a reduction in cross-section being provided in the transition area for flow optimization. The applicant reserves the right to make an independent claim on this continuous transition.

FIG. 9 again shows the course of the W-shaped signal path 64.

Figure 10:
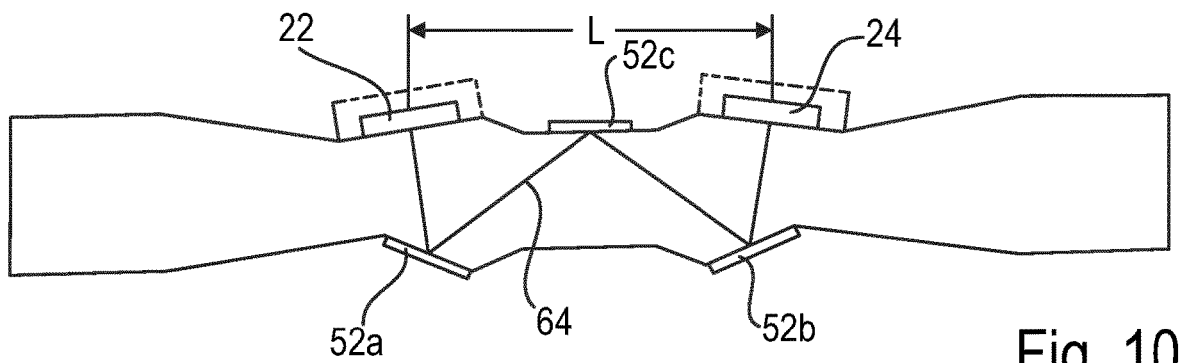

As shown in FIG. 10, the sensor spacing, i.e., the distance between the center axes of the sensors 22, 24, and the geometry of the measuring channel 58 are designed in such a way that the flow is as turbulence-free as possible with low pressure loss and optimum gearing factor, whereby the channel geometry reliably prevents the accumulation of air bubbles.

Figure 11:
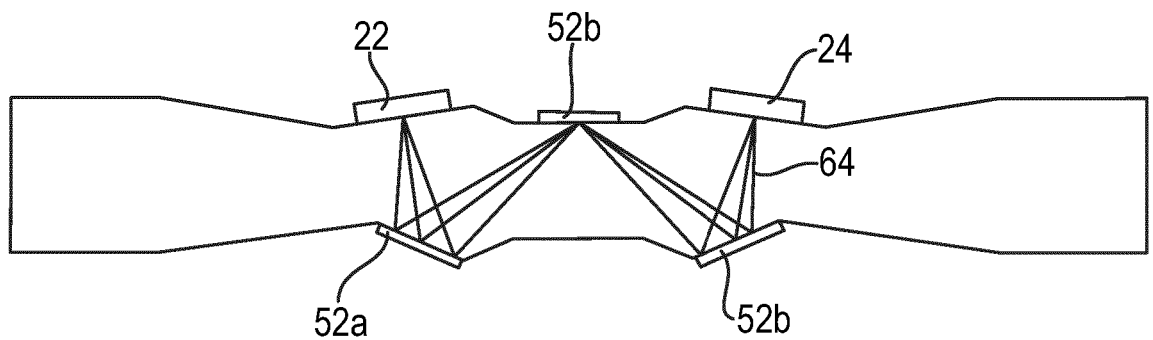
Figure 12:
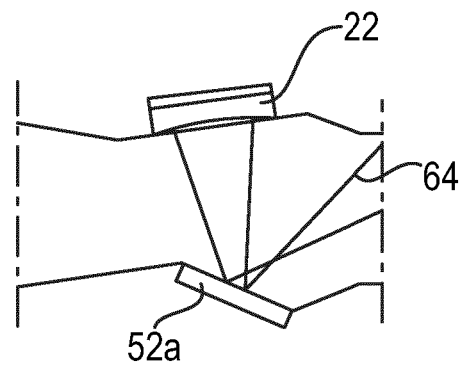
Figure 13:
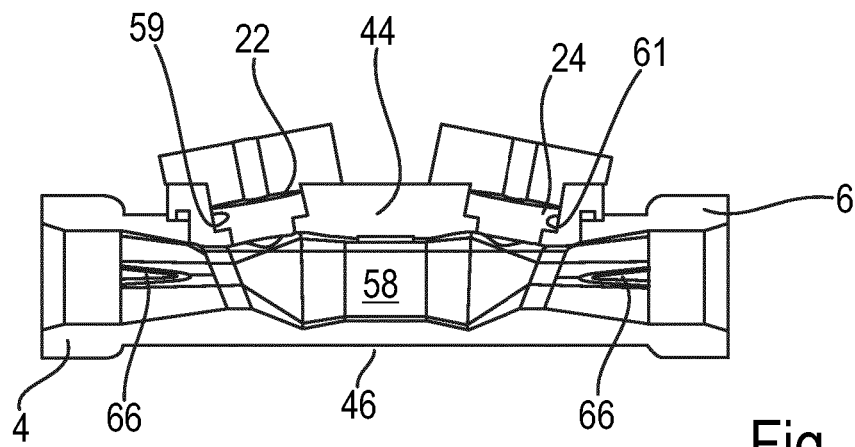

The focusing of the measuring beams can be further improved if, according to FIGS. 11 and 12, the reflection surfaces of the reflectors 52*a*, 52*b*, 52*c* and/or the coupling surfaces of the sensors 22, 24 are concavely rounded so that optimum focusing of the measuring beams towards the reflectors 52*a*, 52*b*, 52*c* and the sensor 24 on the receiver side is ensured.

FIG. 13 again shows the geometry of the measuring channel 58 described above and the obliquely positioned sensors 22, 24 and the W-shaped reflectors 52*a*, 52*b*, 52*c* as well as the cross-sectional variations designed with a view to equalizing the fluid flow. In the example shown in FIG. 13, guide ribs 66 are formed in the transition area on the inlet and outlet sides of each insert 4, 6, which optimize the flow in the transition area.

FIG. 14 shows a further design example of a measuring channel insert 20, wherein the area forming the actual measuring channel 58 is made in one piece. The inserts 4, 6 are then again attached to this measuring channel insert 20, as in the design examples described above, forming the fluid inlet and the fluid outlet. These inserts 4, 6 are again of identical design.

The assembly is conducted as in the design example described above. First, the fluid inlet insert 4 and the fluid outlet insert 6 are inserted into the cast flow channel 10. In the next assembly step, the measuring channel section 42 is then inserted into the flow channel 10 section by section in the radial direction. The arrangement of the sensors 22, 24 and the reflectors 52*a*, 52*b*, 52*c* and the course of the measuring channel 58 correspond to the design example described above, so that further explanations are unnecessary.

FIG. 15 shows an exploded view of a variant of a flowmeter 1, whose design corresponds approximately to that in FIG. 2, although the number of components is reduced compared to the solution described above. This is achieved in particular by contacting the sensors 22, 24 via moldings 68, 70, whereby the sensors 22, 24 are bonded to the measuring channel insert 20, specifically to the measuring channel upper part 44.

In principle, the flowmeter 1 shown consists of the flow channel 10 made of a cast material, on which the flange 18 with the recess 60 is formed. The inlet insert 4, the outlet insert 6, the measuring channel lower part 46 and the measuring channel upper part 44 are inserted through these, whereby the two inserts 4, 6 are displaced in the radial direction towards the respective connection 12, 14 for assembly. The flow channel 10 (housing) is connected to the measuring channel insert 20 via the connecting bolts 80. The two sensors 22, 24 are inserted into the measuring channel upper part 44, whereby they are glued together, for example. Contact is then made via moldings 68, 70, the free end sections of which are in contact with the aforementioned control unit 30, as explained. The control housing 32 is then placed on the measuring channel upper part 44, which in turn may be provided with a housing cover 34 that provides a view of a display (EDU) 74.

FIG. 16 shows views of a design example in which the sensors (piezo elements) 22, 24 are bonded to the multi-part measuring channel insert 20, the contacting in this design examples is realized using cables or (not shown) moldings 68, 70 with conductor paths 90, 92.

FIG. 17 shows a design example of a flowmeter in which the control unit 30 and an EDU (electronic display unit) 74 are interlocked with the housing flange 28 of the measuring channel insert 20 shown in FIG. 4.

In this regard, as explained above, the actual control unit 30 comprising a main PCB 72, an EDU 74, and possibly a communication module not shown (see the following designs), is latched to the aforementioned support structure 36, which in turn also supports the desiccant 38 provided on both sides of a battery 78 arranged on the bottom side of the PCB 72.

The support structure 36 is then fixed to the housing flange 28 of the measuring channel insert 20. This can also be realized using a snap-in connection or a screw connection or the like.

In the variant shown in FIG. 18, the control housing 8 is connected to the housing flange 28 of the measuring channel insert 20 and the flange of the flow channel using connecting bolts 80, which pass through the housing flange 28 of the measuring channel insert 20 and a corresponding housing section of the control housing 32 as well as the flange 18 and thus fix these components in position in a force-fit and form-fit manner. The top cover of the control housing 8 is provided by the housing cover 34.

According to FIG. 19, this housing cover 34 can be designed as a cap which is latched to the control housing 32 and carries characteristic data of the flowmeter 1. In an alternative design shown in FIG. 19, a type of information plate 48 is inserted into the control housing 32 which is closed at the top.

FIG. 20 again shows a detailed view of the flowmeter 1 with the measuring channel insert 20, the flow channel 10 and part of the control housing 8 mounted thereon. The geometry of the measuring channel 58 has already been explained above. The illustration in FIG. 20 shows that, in principle, only the inlet insert 4 and the outlet insert 6 as well as the flow channel 10 need to be changed for different nominal sizes.

In the example shown in FIG. 21, the sensors 22, 24 are fixed in position and contacted via SMD spring contacts 82, which are additionally fixed in position after assembly by a material connection, for example by thermal welding.

The SMD spring contacts 82 are mounted as shown in FIG. 21 so that they force the sensors 22, 24 into the contact position in the pockets 59, 61. After this preliminary bracing, the SMD spring contacts 82 can then be thermo-welded in the predetermined position. As will be explained in more detail below, contact boards without bracing can also be used instead of the spring contacts 82.

FIG. 21 shows a possible assembly sequence. As indicated, in the first step of the process, the sensors 22, 24 are inserted into the measuring channel upper part 44. The spring contacts 82 are connected to the lines 54, 56 and are placed on the sensors 22, 24 as shown in FIG. 21 on the right and are thereby braced below an undercut, the position of the spring contacts 82 being predetermined by reference pins 86 which enter into corresponding reference recesses 88 of the spring contacts 82.

In a subsequent process step, the material is joined by thermal welding. In principle, of course, the spring preload can also be dispensed with—as explained, this will be discussed in the following.

In the variant according to FIG. 22, the moldings 68, 70 mentioned at the beginning are used for contacting. They are inserted into the measuring channel insert 20, in particular the housing flange 28 receiving the control unit 30. Positional fixing can also be achieved by bracing the molded parts 68, 70 and/or by a material bond. As shown in FIG. 22, the moldings 68, 70 are designed with corresponding conductive paths 90, 92 that form the corresponding signal and power paths (64). Moldings 68, 70 are approximately L-shaped with a flat base 94, the geometry of which corresponds approximately to that of the spring contacts 82. In this regard, the conductive paths 90, 92 are configured to allow contacting of the sensors 22, 24 along the large surface of the sensors 22, 24 facing the viewer in FIG. 22. Reference recesses 88 are again implemented on this base 94, through which housing-side reference pins 86 pass. A respective contact arm 96 projects upwardly from the base 94, toward the main PCB 72, with the free end sections of the contact arms 96 then touch the corresponding contacts of the main PCB 72 to make contact therewith. Moldings 68, 70 are spring-loaded in this case, so that optimized contact with the main PCB 72 is ensured. In principle, this area can also be soldered or otherwise materially bonded.

As explained, cables or the like can be used instead of the moldings 68, 70.

In FIG. 22, it can also be seen quite clearly that a housing seal 98 is arranged between the housing flange 28 of the measuring channel upper part 44 and the control housing 32, which is not shown, on the housing flange 28, via which the control housing 8 is sealed.

In the design example according to FIG. 23, the control unit 30 is also materially connected to the measuring channel insert 20, specifically to the measuring channel upper part 44. In this design example, the sensors 22, 24 are bonded to the measuring channel insert 20 in the manner described above, with contact being made via moldings 68, 70. Similar to the above-described design example, in this design, support pins 100 are implemented on the measuring channel top 44, which are inserted into corresponding pin cutouts 102 of the main PCB 72, with the position then fixed by thermal welding after the attachment. In the view according to FIG. 23, one can also see the structure of the control unit 30, which will be explained in more detail below, with the main PCB 72, the battery 78 arranged underneath (view according to FIG. 23) and the EDU 74 arranged on the board, as well as a communication unit, if applicable. This will be discussed in more detail below.

FIG. 24 shows a further simplified design example in which a part of the measuring channel insert 20 and the flow channel 10 at least partially accommodating it are implemented in one piece.

As shown in FIG. 24 on the left, in a first manufacturing step, a kind of outer shell (outer housing) is first manufactured by injection molding with a fiber-reinforced thermoplastic, on which connection pieces 12, 14, the base of the flange 18 for receiving the control unit 30 and also a space for partially receiving the measuring channel insert 20 are already implemented.

In a second step, the reflectors 52 are then inserted into this blank and, if necessary, further components are positioned, which are then overmolded in a third process step with a standard plastic, which need not necessarily be of fiber-reinforced design. This overmolding establishes the contour/profiling of the previously described measuring channel 58 (see FIGS. 7 to 15). To simplify production, this plastic is designed with a comparatively low melting point, so that the outer fiber-reinforced plastic is not melted or infused.

This housing, produced by injection molding, corresponds broadly to the flow channel 10 described above, with the measuring channel insert 20 with the measuring channel upper part 44 then being inserted into it. The measuring channel lower part 46 is integrated into the housing (flow channel 10).

The result is then an assembly produced in a two-stage molding process, which in principle consists of the flow channel 10 and the measuring channel base 46. The control unit 30 or the control housing 8, the sensors 22, 24 and the moldings 68, 70 and the inserts 4, 6 are then attached in the manner described above.

FIG. 25 again shows a detailed illustration showing the connection of the flow channel 10 (housing) with the measuring channel upper part 44 and the control housing 8 via the connecting bolts 80. As explained, the control housing 8 surrounds the actual control unit 30 with the battery 78, the main PCB 72 and the EDU 74. The sensors are not visible in this sectional view. Accordingly, the connection is made by the aforementioned connecting bolts 80 which pass through alternatively implemented projections of the components (control housing 8, measuring channel insert 20, measuring channel upper part 44 and flow channel 10) and are sealed to the outside.

FIG. 26 shows a variant of the design example initially shown in FIG. 4. In the variant according to FIG. 26, the sensor holder 26 is not screwed on, but is fixed in position in the flange of the measuring channel upper part 44 by locating pins 103. In all other respects, the design example corresponds to that in FIG. 4, so that further explanations are unnecessary.

As indicated in the illustration according to FIG. 8, the length L of the measuring channel, i.e., in principle the distance between the two recesses 60, 62 or the sensors 22, 24 is relatively small compared to conventional solutions. According to the invention, for example, for nominal diameters DN of 110 or 80, the length of the measuring channel L (distance between the sensors 22, 24 or the recesses 60, 62) can be less than 40 mm, whereby the gearing mentioned at the beginning is optimized compared to conventional solutions.

FIG. 27 shows another design example of a flowmeter 1 according to the invention, which is relatively close to the design examples described above. This flowmeter 1 also has a cast flow channel 10 with two connection pieces 12, 14, to which a measuring housing 2 is attached. The measuring housing 2 has a control housing 8, which is tapered towards the flow channel 10 (housing)—this will be discussed in more detail below. A housing cover 34 or "cap" is placed on the control housing 8, which is designed with a cover 104 that, when open (view according to FIG. 27), provides a view of a display (EDU 74), of which only a display window 106 can be seen in the representation according to FIG. 7.

Further components of this flowmeter 1 can be seen in FIG. 28, which again shows an exploded view of the flowmeter 1. The flow channel 10 again has a tangentially arranged flange 18 with the recess 16. Guides 109 are shown on the side of the flange 18 for a locking mechanism explained in more detail below.

The measuring housing 2 is designed with a multi-part measuring channel insert 20, which in principle—similar to the design examples described at the beginning —consists of a measuring channel lower part 46, a measuring channel upper part 44, two inserts 4, 6 and a control housing 8, which together form the peripheral wall of the measuring channel 58. As will be described in more detail below, a bottom of the control housing 8 thereby delimits the measuring channel 58 together with the measuring channel upper part 44 and the measuring channel lower part 46.

The control housing 8, which is closed at the bottom, contains the actual control unit 30 with the battery 78, the main PCB 72, the EDU 74 and a communication module 108. In the illustrated design example, the control housing 8 has a cover flange 110 on which a cover glass 112 is supported, which is locked by a two-part sliding frame 114. In the closed position, it surrounds both the cover flange 110 and the periphery of the cover glass 112, whereby the two sliding frame halves can be latched to each other so that the cover glass 112 is pressed against the end face of the cover flange 110 with pretension via a seal 116. This sliding frame 114 can also be used to fix the position of the housing cover 34 to the cover 104. As explained at the outset, the housing cover 34 may be provided with information about the flowmeter 1 and thus acts as a kind of ID plate. The measuring channel insert 20 is sealed towards the flow channel 10 by a seal 118 as well.

FIG. 29 shows a longitudinal section through the assembled flowmeter 1 as shown in FIGS. 27 and 28. Control housing 8 accommodating the control unit 30 can be seen in this illustration. The battery 78 can be seen here, which is arranged on the underside of the main PCB 72 and thus supplies power to the electrical loads. Parallel to the main PCB 72, there are the communications module 108 and the EDU 74, which are covered by the cover glass 112. Both the EDU 74 and the communications module 108 are contacted with the main PCB 72 (also referred to as the "metrology board"), so that these elements are controlled by the PCB 72.

As explained above, the cover glass 112 rests on the cover flange 110 of the control housing 8 via a seal 116 and is held in its desired position via the latched sliding frame 114, so that the control housing 8 is reliably covered at the top. As mentioned above, in this design example, the control housing 8 is designed with a closed bottom 120 on which the two pockets 59, 61 are implemented, in which the ultrasonic sensors 22 24 are inserted. In the design example shown, these are bonded to the bottom 120. As will be explained in more detail later, contact is made in each case via contact boards 124, 126, which are connected to the main PCB 72 via cables/leads 54 or via the aforementioned moldings 68, 70 with conductor paths 90, 92.

The measurement signals from the sensors 22, 24 are coupled in and out of the measuring channel 58 directly through the bottom 120 of the control housing 8. The bottom end section of the control housing 8 is inserted into the recess 60 of the flange 18 of the flow channel 10, with sealing being provided by a further seal 118 arranged between the housing bottom or the peripheral wall of the control housing 8 adjacent thereto and the flange 18. The control housing 8, in particular the bottom 120, is connected to the measuring channel upper part 44, which is only partly visible, and the measuring channel lower part 46, which is shown in the section. The design of these components will be explained later with reference to FIGS. 30 to 36. As can be seen clearly in the illustration according to FIG. 29, the two reflectors 52a, 52b are accommodated in recesses of the measuring channel lower part 46, while the third reflector 52c is embedded in the measuring channel upper part 44. Accordingly, a W-shaped signal path 64 results. The inlet insert 4 and the outlet insert 6 are arranged to the side of the measuring channel upper part 44 and the measuring channel lower part 46, respectively, both of which are partially protruding in the connection pipe 12 and 14, respectively.

The total length L of the measuring channel insert 20 with the two inserts 4, 6 and the measuring channel upper part 44 and the measuring channel lower part 46 is greater than the clear width I of the recess 16. Radial insertion is only possible due to the multi-part design of the measuring channel insert 20. The main advantage is that no compromises have to be made with regard to profiling as with the state of the art, which has to be pushed in on the face side from the inlet or outlet. As can be seen in the illustration according to FIG. 29, supports 128 are still provided on the bottom 120 on which the battery 78 rests. In this design example, the described guide ribs 66 are also provided in the area of the two inserts 4, 6 for flow optimization. The reflectors 52a, 52b, 52c can be materially connected to the measuring channel upper part 44 or the measuring channel lower part 46 by injection molding, for example.

Details of the components of the measuring channel insert 20 are explained using FIGS. 30 to 36. FIG. 30 shows a top view of the control housing 8, which is closed at the bottom (away from the viewer in FIG. 30) by the bottom 120. FIG. 31 shows the control housing 8 in view of this bottom 120. In the illustration according to FIG. 30 above, the cover flange 110 can be seen with an installation space 130 for the seal 116. As explained, the two pockets 59, 61 are implemented in the bottom 120, with their bottom surfaces polished to ensure optimal coupling and decoupling of the measurement signals on the one hand and optimal connection of the sensors 22, 24 resting on these bottom surfaces on the other. A measuring channel adapter 132 is provided on the large surface of the bottom 120 visible in FIG. 31 to provide a positive connection with the measuring channel upper portion 44 and the measuring channel lower portion 46. For this purpose, the measuring channel adapter 132 is designed in the central area with four fitting recesses 134, into which corresponding fitting elements of the measuring channel lower part 46 are inserted. Coupling or decoupling surfaces 136, 138 are formed laterally of these mating recesses 134 and may also be polished to optimize signal quality. Steps 140 are provided in the peripheral area of the measuring channel adapter 132 for positioning the measuring channel upper part 44 and the measuring channel lower part 46, so that the components of the measuring channel insert 20 can be mounted with a precise fit.

FIG. 32 and FIG. 33 show views of the measuring channel top 44 attached to the measuring channel adapter 132. Accordingly, the measuring channel top 44 has two side walls 142, 144 that are connected to each other by a bracket 146. The reflector 52c is arranged on this bracket 146 between the two side walls 142, 144, the reflector being preferably integrated by injection molding. In the area of the side walls 142, 144, which are designed approximately with an L-shaped profile, breakthroughs 153a, 153b, 153c, 153d are implemented in each case, the spacing of which corresponds to that of the fitting recesses 134. Further fitting elements are provided along the bracket 146 and the side walls 142, 144, which are formed in accordance with the measuring channel adapter 132 or the other contour of the bottom 120 of the control housing 8, so that a precisely fitting assembly of the measuring channel upper part 44 is possible.

FIG. 34 shows a top view of the measuring channel lower part 46, in whose bottom surface 149 the two reflectors 52a, 52b are embedded. The bottom surface 149 connects two walls 150, 152, which in the assembly position (see FIG. 29) embrace the two side walls 142, 144 of the measuring channel upper part 44. Four locating pins 154a, 154b, 154c, 154d and further locating projections 156a, 156b are provided on the longitudinal edges of the walls 150, 152 facing the viewer, which in the assembled state pass through the breakthroughs 153a, 153b, 153c and 153d (the latter not visible) formed on the side walls 142, 144 of the measuring channel upper part 44 and then enter the locating recesses 134a, 134b, 134c, 134d. The fitting projections 156a, 156b thereby reach into lateral recesses 160a, 160b of the side walls 142, 144. Further relative positioning of the measuring channel upper part 44 with respect to the measuring channel lower part 46 is achieved using locating pins 162a, 162b, 162c, 162d of the measuring channel upper part 44 which engage in corresponding grooves 164a, 164b, 164c, 164d of the measuring channel lower part 46.

The two inserts 4, 6, which are of identical design, form the inlet and outlet ends of the measuring channel insert 20. These inserts 4, 6 have—as can also be seen from the sectional view in FIG. 29—a tapered tube section 166, the diameter of which becomes smaller towards the actual measuring channel 58, with at least two of the guide ribs 66 being provided on the peripheral walls. A profile body 168 is provided at the end section facing the measuring channel upper part 44/measuring channel lower part 46, via which the round cross-section of the pipe section 166 is reduced to the rectangular cross-section of the measuring channel 58. This profile body 168 also protrudes radially beyond the outer circumference of the pipe section 166 and thus acts as an axial stop when the inserts 4, 6 are pushed into the area of the connection pieces 12, 14. As can be seen from the sectional view in FIG. 29, the end faces of these profile bodies 168 also rest against steps 170 of the bottom 120 in the assembled state, so that the measuring channel insert 20 is reliably positioned.

FIG. 37 shows the open control housing 8 with a view of the bottom 120 with the two pockets 59, 61 in which the two sensors 22, 24 are inserted. Contact is made—as explained above—via the two contact boards 124, 126 and lines 54 (cables) not shown or the moldings 68, 70. The design of these contact boards 124, 126 is explained using FIGS. 38 and 39.

FIG. 38 shows a contact board 124 as used in the design example shown in FIG. 37. This contact board 124 has a center contact piece 170 on which conductive paths are implemented for contacting the sensor 22. This sensor 22 is designed in such a way that both electrodes 172, 174 are accessible on the large surface visible in FIG. 38, so that contact can be made via a corresponding design of the contact piece 170. This concept with electrodes 172, 174 implemented on one side of the sensor 22 makes it possible for the latter to be connected to the bottom 120 of the control housing 8 or of a measuring channel insert 20 simply by bonding, so that contact is then made from above, i.e., from the side facing away from the bonding.

In the design example shown, the contact piece 170 with the conductive paths implemented thereon is connected to the electrodes 172, 174 by soldering or bonding, the exact positioning of the contact board 124 being effected by means of two board arms 176, 178, in each of which a fitting recess 180, 182 is provided, which are penetrated at the correct reference position by fitting pins 154 provided in the pockets 59, 61.

FIG. 39 shows a variant of the design example according to FIG. 38. In this design example, the contact board 124 is designed with four board arms 176, 178, 184, 186 evenly distributed around the circumference, in each of which in turn a fitting recess 188 is provided, to which corresponding fitting pins 154 are assigned in the pockets 59, 61. Such a concept allows for more accurate relative positioning of the sensors 22, 24 with respect to the contact boards 124, 126 and also with respect to the pockets 59, 61.

Particularly in the case of small nominal diameters and short measuring channel lengths (DN 15/LL80), it can be difficult to reach the connection pieces 12, 14 with the tools for connecting the flowmeter 1 to the pipeline, as a wrench, for example, collides with the measuring housing 2. In order to simplify the application of a wrench or the like, an alternative concept according to the invention is to taper the measuring housing 2 towards the flow channel 10 as shown in FIG. 40. In FIG. 40, two flowmeters are shown in an exploded view with the meter housing 2 not yet connected to the flow channel 10 (housing). Depending on the length (LL80/LL110), the length l of the recess in the flange 18 through which the measuring channel insert 20 (visible in FIG. 40) can be inserted also changes accordingly. This insert is designed according to the above-described design examples. As is clearly visible in the illustration according to FIG. 40, the control housing 8 is tapered, in particular towards the connection pieces 12, 14, whereby the application of a tool is simplified by the obliquely set wall surfaces 190, 192 of the control housing 8. Here, the maximum taper depends on the length of the flowmeter 1. In the comparatively short design example shown in FIG. 40 on the left, the taper is more pronounced than in the comparatively long measuring channel 58 shown in FIG. 40 on the right. With such long measuring channels 58, however, the problem described at the beginning does not arise to such an extent, since the connection pieces 12, 14 then tend to protrude axially beyond the control housing 8, making it easier to apply the tool than with short flowmeters.

In principle, the goal is to install batteries 78 that are as large as possible, since the service life of the flowmeter 1 is then improved. Accordingly, efforts are being made to use D-cell batteries with improved capacity and performance instead of the conventional C-cell batteries, but these batteries are much bulkier than the more compact C-cell batteries. This is shown quite clearly in FIG. 41. A flow meter of comparatively short length (LL80) is shown in the upper section, with a C-cell battery 78 inserted into the tapered control housing 8. The battery is arranged in a known manner so that its longitudinal axis is parallel to the direction of flow through the measuring channel 58. That is, FIG. 41*a*) shows the front view of the battery 78 and FIG. 41*b*) shows the side view of the battery 78 and also of the measuring channel 58. In this illustration, the limitation of the measuring channel cross-section by the profile bodies 168 of the inserts 4, 6 can also be seen quite clearly.

FIGS. 41*c*), 41*d*) show corresponding designs with D-cell batteries 78. Due to the considerably larger volume of these battery types, the control housing 8 must also be designed to be more voluminous. Furthermore, in most cases it is necessary to change the orientation of the battery 78 as shown in FIGS. 41*c*) and 41*d*) so that the longitudinal axis of the cylindrical D-cell battery 78 is arranged transverse to the measuring channel axis. That is, the battery 78 must be changed by 90° in the design example according to FIGS. 41*c*) and 41*d*) compared to the position of the battery 78 in the design example according to FIGS. 41*a*) and 41*b*). This is accompanied by a considerable additional expense. Thus, the change to a different battery for an improved service life comes with certain disadvantages, namely the redesign of the control housing 8.

Using FIG. 42, the closing of the control housing 8 on the display side is briefly explained once again. As described above, when the flowmeter 1 is assembled, the control unit 30 with the main PCB 72 and EDU 74, which are not visible in this illustration, and the communication module 108 with the sensors 22, 24 and their contacting elements are inserted into the interior of the control housing 8. In the next step, as shown in FIG. 42*b*, the seal 116 is inserted into the cover flange 110, the cover glass 112 is fitted and, if necessary, the housing cover 34 (cap) is also fitted, whereby this can be latched to the cover flange 110, for example, in order to pre-fix the cover glass 112 and the housing cover 34.

After this pre-assembly, the sliding frame 114 with its two frame pieces is placed on the cover flange 110 and the components mounted thereon and pushed together until the two sliding frame pieces lock with each other and fix the position of the housing cover 34 and the cover glass 112.

The connection of the measuring housing 2 with the flow channel 10 is shown in FIG. 43. As explained above, the measuring housing 2 with the measuring channel insert 20 is inserted into the recess 16, with the bottom 120 of the control housing 8 resting on the flange 18 of the flow channel 10. For example, the sliding frame 114 is not yet locked and the two connecting bolts 80 are not yet inserted. In the next step, the latter are connected to the measuring housing 2 or the control housing 8 by inserting the connecting bolts 80 for force-locking and form-locking connection of the flow channel 10. In a final process step (on the right in FIG. 43), the sliding frame 114—as explained with reference to FIG. 42—is then pushed together and locked in place so that all components of the flowmeter 1 are reliably positioned relative to each other.

In the event that a communication module 108 is provided and it is to be equipped with a powerful antenna 191, tit is preferably positioned in the control housing 8, i.e., below the cover glass 112, as shown in FIG. 44. It is assumed that the antenna 191 is provided with an antenna winding 193 that is in contact with the communication module 108 or the communication board 194. Due to the comparatively small installation space above the communication module 108 or the communication board 194, the integrated antenna 191 can be relocated in such a way that it can be positioned above the plane defined by the EDU 74 and the communication board 194, despite the antenna winding 193 having a comparatively large diameter. That is, according to the design example in FIG. 44 on the left, the antenna winding 193 is arranged laterally in the area of the EDU 74. In the design example shown in FIG. 44 on the right, the antenna winding 193 is located in the area of the communication board 194, with the antenna wire initially extending laterally around the communication board 194 and the EDU 74 adjacent thereto.

FIGS. 45 and 46 show an alternative solution. In this variant, the antenna 191 does not have to be flush integrated but can protrude beyond the control housing 8. The antenna winding 193 is arranged vertically to the large surface of the communication board 194, whereby, however, as shown in FIG. 46, to protect it from external damage, a housing cover 34, which closes off the control housing 8 at the top (view according to FIG. 46), is provided with an outwardly closed antenna mount 196, into which the antenna winding 193 is inserted, so that the antenna 191 is covered from the outside, but has optimum transmission/reception behavior due to the vertical arrangement.

In this design example, the housing cover 34 is provided with a display window 106, and a cap 198 is also placed on the housing cover 34, which may, for example, function as an ID plate or be provided with other information. This cap 198 has a recess 200 through which the antenna mount 196 with the antenna winding 193 are routed. In all other respects, the design example shown in FIG. 45 corresponds to the design examples described above, so that further explanations are unnecessary.

FIG. 47 shows another design example of a flowmeter 1 in which, in a variation of the design examples described above, the upper part of the measuring channel 44 is integrated into the control housing 8. In other words, the fitting elements of the measuring channel upper part 44 are implemented on the bottom 120 in the design example shown in FIG. 47. These fitting elements are provided with the reference number 200 in the illustration according to FIG. 47 as an example and complement each other with the measuring channel lower part 46 to form the measuring channel 58 or the measuring channel insert 20 which, according to the illustration in FIG. 47, is inserted on the right into the recess 16 in the flange 18 of the flow channel 10. In this design example, the two reflectors 52*a*, 52*b* are then also provided in the measuring channel lower part 46, while the fitting elements 200 also accommodate the reflector 52c, so that a W-shaped signal path 64 can again be realized.

The assembly is similar to the design examples described above. In a first process step, the two inserts 4, 6 are inserted through the recess 16 into the flow channel 10 and moved in the axial direction towards the connection pieces 12, 14 so that space is created for inserting the measuring channel insert 20 with the measuring channel lower part 46 and the fitting elements 200 implemented on the bottom 120 of the control housing 8. By insertion, the elements held on the control housing 8 (fitting elements 200 and measuring channel lower part 46) complement the inserts 4, 6 to realize the measuring channel insert 20, with the seal 116 providing the seal to the outside.

When changing the nominal size, the flow channel 10 and the inserts 4, 6 have to be replaced only, while the other components can be retained.

In the above-described design examples, the control housing 8 and the measuring channel insert 20 are made of a different material than the flow channel 10. It is usually made from a cast alloy, such as brass.

FIGS. 48, 49 show a design example in which a composite flow channel 10 is connected to the control housing 8 so that, a flowmeter 1 is provided which, in its essential components, is made of very light and resistant fiber-reinforced plastic or other composite material. This flow channel 10, which is made of a composite material, can be manufactured using a multi-stage injection molding process as described, for example, with reference to FIG. 24, so that further explanations are unnecessary.

In the above-described design examples, individual moldings 68, 70 are provided for each contact of a sensor 22, 24. In principle, these moldings 68, 70 can also be joined together to form profile parts, so that both sensors 22, 24 are contacted via a common profile body, which is occupied by different conductor paths 90, 92 to enable individual control of the sensors 22, 24.

Disclosed is a flowmeter with an optimized flow cross-section.

LIST OF REFERENCE NUMBERS

1 Flowmeter
2 Measuring housing
4 Inlet insert
6 Outlet insert
8 Control housing
10 Flow channel
12 Connection piece
14 Connection piece
16 Recess
18 Flange
20 Measuring channel insert
22 Sensor
24 Sensor
26 Sensor holder
28 Housing flange
30 Control unit
32 Control housing
34 Housing cover
36 Support structure
38 Desiccant
40 Display
42 Measuring channel section
44 Upper part of measuring channel
46 Lower part of measuring channel
48 Information plate
52 Reflector
54 Cable
56 Cable
58 Measuring channel
59 Pocket
60 Recess
61 Pocket
62 Recess
64 Signal path
66 Guide rib
68 Molding
70 Molding
72 Main PCB
74 EDU
78 Battery
80 Connecting bolt
82 SMD spring contact
86 Reference pin
88 Reference recess
90 Conducting path
92 Conducting path
94 Base
96 Contact arm
98 Housing seal
100 Support pin
102 Pin cutout
103 Fitting bolt
104 Cover
106 Display window
108 Communication module
109 Guide
110 Cover flange
112 Cover glass
114 Sliding frame
116 Seal
118 Seal
120 Bottom
124 Contact board
126 Contact board
128 Support
130 Installation space
132 Measuring channel adapter
134 Fitting recess
136 Coupling surface
138 Decoupling surface
140 Step
142 Sidewall
144 Sidewall
146 Bracket
148 Fitting recess
149 Bottom surface
150 Wall
152 Wall
153 Breakthrough
154 Fitting pin
156 Fitting projection
160 Recess
162 Fitting pin
164 Groove
166 Pipe section
168 Profile body
170 Contact piece
172 Electrode
174 Electrode
176 Board arm 178 Board arm
180 Fitting recess
182 Fitting recess
184 Board arm
186 Board arm
188 Fitting recess
190 Wall surface
191 Antenna
192 Wall surface
193 Antenna winding
194 Communication board
196 Antenna mount
198 Cap
200 Fitting element
200 Recess

The invention claimed is:

1. A flowmeter with a flow channel which can be attached to a pipeline through which a fluid flows and on which a measuring unit is held, which has at least two sensors spaced apart from one another, are designed as ultrasonic transducers, which transmit their measurement signals through at least one recess of the flow channel and coupled with a control unit accommodated in a control housing for activating the sensors and for processing the measurement signals, with a measuring channel realized by a multi-part measuring channel insert, which has at least a measuring channel upper part and a measuring channel lower part, which at least partially delimit a measuring channel section, wherein the measuring channel insert is configured to be inserted through the recess, wherein an inlet and an outlet insert which are attached to the measuring channel section are also configured to be inserted through the recess, wherein the length of the measuring channel section and the inserts is greater than the clear width of the recess.

2. The flowmeter according to patent claim 1, wherein both inserts are identical in design.

3. The flowmeter according to patent claim 2, wherein the inlet and outlet inserts are formed with an axial stop towards the measuring channel lower part or the measuring channel upper part.

4. The flowmeter according to patent claim 1, wherein the measuring channel lower part and/or the measuring channel upper part remain the same for different nominal widths of the flow channel and only the inserts are configured to be adapted to the nominal width of the pipeline and thus of the flow channel.

5. The flowmeter according to claim 1, wherein the inserts and the measuring channel section are designed in such a way that in a transition area from the fluid inlet and/or fluid outlet to the measuring channel a reduction of the flow cross-section is carried out in each case in such a way that the fluid is accelerated in this area.

6. The flowmeter according to claim 1, wherein guide ribs are formed in the measuring channel in the area of the inlet and outlet inserts.

7. The flowmeter according to claim 1, wherein the measuring channel upper part has a housing flange to which the control housing is attached, and which forms a bottom of the control housing.

8. The flowmeter according to claim 1, wherein the measuring channel upper part and the measuring channel lower part are attached to a bottom of the control housing and with this peripherally delimit the measuring channel section.

9. The flowmeter according to patent claim 8, wherein the measuring channel upper part, the measuring channel lower part and the control housing are positively positioned relative to one another, by fitting pieces or fit recesses.

10. The flowmeter according to claim 1, wherein the measuring channel section has a rectangular cross-section, wherein a width of the measuring channel is greater in the direction towards the control housing than transversely thereto.

11. The flowmeter according to claim 1, wherein the length of the measuring channel section is less than 40 mm for a nominal size of DN110 or DN80.

12. The flowmeter according to claim 1, wherein at least one reflector is held on the measuring channel lower part and/or on the measuring channel upper part, in a material-locking manner.

13. The flowmeter according to claim 1, wherein the sensors are mounted on inclined support surfaces of the measuring channel upper part or the bottom of the control housing.

14. The flowmeter according to claim 1, wherein the sensors are fixed in position by material bonding, by adhesive bonding or by pre-tensioning.

15. The flowmeter according to claim 1, wherein the sensors are contacted with a main PCB via cables or plastic moldings provided with conductor paths.

16. The flowmeter according to patent claim 15, wherein each sensor is contacted with a contact board, which in turn is contacted with the main PCB via cables or plastic moldings.

17. The flowmeter according to patent claim 16, wherein the contact board is soldered or bonded to the sensor, wherein the sensor electrodes are formed in the area of a large surface remote from the bottom of the control housing or the measuring channel upper part and/or along a peripheral wall of the sensor.

18. The flowmeter according to patent claim 16, wherein the contact board is positively positioned, via reference recesses and reference pins engaging therein, with respect to the control housing or the measuring channel upper part.

19. The flowmeter according to claim 1, wherein the control housing has a housing cover with a display.

20. The flowmeter according to patent claim 19, wherein the housing cover is connected to the control housing via a multi-part sliding frame.

* * * * *